United States Patent
Sun et al.

[11] Patent Number: 5,999,574
[45] Date of Patent: Dec. 7, 1999

[54] DIGITAL FILTER SYSTEM, CARRIER REPRODUCTION CIRCUIT USING THE DIGITAL FILTER SYSTEM, AND DEMODULATION CIRCUIT USING THE CARRIER REPRODUCTION CIRCUIT

[75] Inventors: Weimin Sun, Kunitati; Hirofumi Yamauchi, Nara; Michio Nakajima, Osaka, all of Japan

[73] Assignee: Icom Incorporated, Osaka, Japan

[21] Appl. No.: 08/814,879

[22] Filed: Mar. 13, 1997

[30] Foreign Application Priority Data

Mar. 29, 1996 [JP] Japan .................................. 8-077160
May 31, 1996 [JP] Japan .................................. 8-138888

[51] Int. Cl.$^6$ .................................................. H04L 27/14
[52] U.S. Cl. ...................... 375/326; 375/349; 375/350; 455/303; 455/307; 455/311
[58] Field of Search .................................... 375/229, 232, 375/326, 349, 350; 455/303, 307, 311; 364/724.13, 724.19

[56] References Cited

U.S. PATENT DOCUMENTS 5,226,057  7/1993  Boren .
5,502,747  3/1996  McGrath ................................. 375/350
5,521,946  5/1996  Main ...................................... 375/350
5,548,243  8/1996  Sun et al. .

FOREIGN PATENT DOCUMENTS 8-79120  3/1996  Japan .

*Primary Examiner*—Amanda T. Le
*Attorney, Agent, or Firm*—Frishauf, Holtz, Goodman, Langer & Chick, P.C.

[57] ABSTRACT

An input analog signal is sampled at a sampling frequency $f_s$, which is four times a carrier frequency $f_c$. A demultiplexer 11 outputs supplied data to four systems sequentially, and generates four zero carriers whose frequencies and amplitudes are equal to each other, with only the phases being different. The delay circuits 12 to 15 delay each one of the zero carriers, and supply delayed signals to adaptive filters 16 to 19. Data output from the four adaptive filters 16 to 19 are selected by a multiplexer 22, and the multiplexer 22 outputs the selected signals as a single signal. The difference between a first zero carrier and an output signals of the first adaptive filter 16 is obtained, and tap coefficients of the adaptive filters 16 to 19 are controlled in accordance with an LMS algorithm based on the difference. A signal output by the multiplexer 22 is output as a reproduced carrier.

29 Claims, 13 Drawing Sheets

DIGITAL FILTER SYSTEM, CARRIER REPRODUCTION CIRCUIT USING THE DIGITAL FILTER SYSTEM, AND DEMODULATION CIRCUIT USING THE CARRIER REPRODUCTION CIRCUIT

BACKGROUND OF THE INVENTION

1. Field of the Invention

The present invention relates to a digital filter system which cancels unwanted signal components at the intermediate frequency stage.

The present invention also relates to a demodulation circuit for radio communication, more particularly, to a demodulation circuit to demodulate SSB (Single Side Band) signal, and to a carrier reproduction circuit for the demodulation circuit.

2. Description of the Related Art

In the field of radio communication, filters for canceling unwanted wave (noise) are used at each of the radio frequency (RF), intermediate frequency (IF), and audio frequency (AF) stages of the radio receiver. And for these filters, various improvements have been proposed.

For example, the applicant of the present application proposed "ADAPTIVE FILTER SYSTEM" disclosed in U.S. patent application Ser. No. 08/452,282 now U.S. Pat. No. 5,716,996, for canceling unwanted waves in the AF stage, and for outputting only an objective signal by setting the coefficients of the digital filter using an adaptive algorithm.

FIG. 1 shows the basic structure of the adaptive filter system disclosed in the U.S. patent application Ser. No. 08/452,282. The adaptive filter system is comprised of a delay circuit 91, a filter 92, a subtracter 93, and a controller 94. The delay circuit 91 delays an AF input signal and supplies the delayed signal to the filter 92, and the filtered signal output from the filter 92 is output as an AF output of the adaptive filter system. The subtracter 93 obtains the difference between the AF input signal and the AF output signal. The controller 94 controls the characteristic of the filter 92 based on the difference obtained by the subtracter 93, in accordance with LMS (Least Mean Square) algorithm.

This adaptive filter system is provided at the AF stage. Therefore, the circuits at the RF stage or the IF stage of, for example, a demodulation circuit process the signal including unwanted components. Therefore, the dynamic range of these circuits become narrow and processing error is large. Further, when AGC (Automatic Gain Control) is performed at the IF stage, the amplitude of the object (target) signal is also erroneously adjusted (suppressed) based on the level of the unwanted signal.

A BPF (Band Pass Filter) is used in the superheterodyne receiver to cancel unwanted reception signals. Transmitters for amateur and service radio can change the frequency of the transmission signal within an allowable range. Thus, there is a large possibility that an unwanted signal is in the reception band (in the passing band of the BPF) of the receiver. Further, image interference, radio frequency interference, spurious beats, or the like are easily contaminated to the reception signals. Notch filters are used for conventional amateur and service radio transceivers to cancel unwanted signals in the passing band of the BPF. In recent amateur and service radio transceivers, digital notch filters or adaptive digital notch filter systems are used whose filter coefficients are set by using adaptive algorithms.

An adaptive notch filter system, disclosed in U.S. Pat. No. 5,226,057, for example, converts a received radio-frequency signal to an intermediate-frequency signal, and supplies the intermediate-frequency signal to a plurality of notch filters connected in series to cancel unwanted signal components, then demodulates and outputs the signal output from the series-connected filters.

However, when the notch filter system is formed by using a digital signal processing technique, the processing amount becomes much and processing errors increases as the amount of processing increases.

Recently, in the field of mobile communications or the like, an RZ (Real Zero) SSB system has been proposed as a radio communication system having a good phasing property and a high frequency utilization factor.

The conventional demodulation circuit of the RZSSB signal comprises an FM demodulation circuit having a limiter, a frequency detection circuit, and an integration circuit, and a linearizer. The linearizer, however, comprises a Hilbert transformer, and the quality of the demodulation signal is greatly influenced by the characteristics of the Hilbert transformer. Therefore, although the Hilbert transformer having a good property is required, it is difficult to design the Hilbert transformer having a good property.

To solve this problem, the applicant of the present application also proposed demodulation circuits without a linearizer in Japanese Patent Application Hei 6-206907 and U.S. Pat. No. 5,548,243.

A carrier reproduction circuit disclosed in Japanese Patent Application Hei 6-206,907 produces a low-frequency signal by mixing the received intermediate frequency signal with a local oscillation signal, and abstracts a carrier by passing the low-frequency signal through an active bandpass filter with a narrow pass-band.

A carrier reproduction circuit disclosed in U.S. Pat. No. 5,548,243 prepares an intermediate frequency signal by mixing a received signal with a local oscillation signal, and abstracts a carrier by passing the intermediate frequency signal through the BPF. An FM detection circuit detects the signal output from the BPF. The carrier is reproduced by controlling the local oscillation signal using the detected output.

These carrier reproduction circuits have to reproduce not only the frequency but also the phase of the carrier exactly. When the carrier reproduction circuit comprises an analog circuit, however, the exact reproduction of the carrier is difficult. When the carrier reproduction circuit comprises a digital circuit, its structure and the processing it performs become complex.

SUMMARY OF THE INVENTION

Accordingly, it is an object of the present invention to provide a digital filter system which can cancel unwanted components or noise components of a signal at the intermediate frequency stage.

It is another object to provide a digital filter system which can cancel unwanted components or noise components of a signal at the intermediate frequency stage with less digital signal processing.

It is a further object to provide a carrier reproduction circuit which can reproduce a carrier (carrier signal) exactly with a simple structure and simple processing, and a demodulation circuit having good demodulation characteristics by using the carrier reproduction circuit.

To achieve the above objects, a digital filter system according to a first aspect of the present invention comprises:

demultiplexer means for outputting a digital signal obtained by sampling an analog input signal, at a sampling frequency which is N times a carrier frequency, to N systems sequentially;

N adaptive filters arranged for each of N outputs from said demultiplexer means;

control means for controlling characteristics of said N adaptive filters based on at least one of output signals of the N adaptive filters; and multiplexer means for selecting the output signals of said N adaptive filters, and for outputting selected signals as a single signal.

Said multiplexer means receives the output signals from said N adaptive filters, and may output the single signal by selecting the received signals sequentially. Further, subtraction means may be arranged to obtain the differences between the corresponding N output signals from said demultiplexer means and the output signals of said N adaptive filters, and the multiplexer means may select the N output signals of said subtraction means and output the selected signals as a single signal.

Delay means for delaying the output signals of said demultiplexer means and supplying the delayed signals to the N adaptive filters, may be arranged.

Said N adaptive filters change their own characteristics based on externally supplied tap coefficients, for example.

The tap coefficients of each adaptive filter may be divided into N groups logically. In this case, said control means controls the tap coefficient groups corresponding to said N adaptive filters based on the output signal of each of said N adaptive filters, for example.

A digital filter system according to a second aspect of the present invention comprises:

conversion means for converting a digital signal, obtained by sampling an analog signal at a sampling frequency which is N times a carrier frequency, into N signals whose carrier frequency is substantially zero, by outputting the digital signals to the N systems sequentially;

N adaptive filters for filtering an associating one of N signals output from the conversion means and for changing their own characteristics in accordance with an external signal;

control means for controlling the characteristics of said N adaptive filters based on at least one output signal of said N adaptive filters; and multiplexing means for multiplexing signals from the N adaptive filters and outputting a multiplexed signal as a single signal.

Said multiplexing means, for example, receives the outputs of said N adaptive filters, and outputs the signal by selecting the received signals.

Subtraction means may be arranged to obtain the differences between corresponding N signals output from said conversion means and the output signals from said N adaptive filters.

Said multiplexing means may output a signal by sequentially selecting the N output signals from said subtraction means.

Delay means may be arranged to supply delayed outputs of said conversion means to the N adaptive filters.

Said N adaptive filters change their own characteristics based on tap coefficients supplied from the outside. The tap coefficients for the adaptive filters are logically divided into N groups, for example. In this case, said control means may control the tap coefficient groups corresponding to said N adaptive filters based on the outputs of said N adaptive filters, for example.

A carrier reproduction circuit according to a third aspect of the present invention comprises:

sampling means for sampling a signal, including a carrier, at a sampling frequency which is N times a carrier frequency, and for outputting a sampled signal;

demultiplexer means for outputting the signal from said sampling means to N systems cyclically;

N adaptive filters for passing predetermined signal components of the N output signals from said demultiplexer means; and multiplexer means for multiplexing the signals output from said N adaptive filters and outputting a multiplexed single signal.

A carrier reproduction circuit according to a fourth aspect of the present invention comprises:

conversion means for converting a digital signal, obtained by sampling an analog input signal at a sampling frequency which is N times a carrier frequency, into N signals whose carrier frequency is substantially zero, by outputting the digital signal to N systems sequentially;

N adaptive filters, arranged for each of said N systems, for filtering input signals; and output means for outputting the signals output from said N adaptive filters as a single signal by selecting them sequentially.

In the carrier reproduction circuit according to the third and fourth aspects of the present invention, delay means for delaying the signals of said N systems in order to attenuate a non-cyclic signal, subtraction means for obtaining the difference between at least one of the signals output from said N adaptive filters and an associated signal before being delayed, and control means for controlling the characteristics of said N adaptive filters based on the output of said subtraction means may be arranged.

For example, said N adaptive filters change their own characteristics based on tap coefficients supplied from the outside. The tap coefficients of the adaptive ilters are divided into N groups logically. Said subtraction means comprises N subtracters which obtain the differences between the output signals of said N daptive filters and associated signals before being delayed. Said control means controls associated tap coefficient groups of said N adaptive filters corresponding to the output signals of said N subtracters.

A demodulation circuit according to a fifth aspect of the present invention comprises:

a reception circuit for receiving radio signals;

a carrier reproduction circuit for reproducing a carrier from an input signal input by said reception circuit;

an amplifier for amplifying the carrier reproduced by said carrier reproduction circuit;

an adding circuit for generating a signal having an emphasized carrier by adding the amplified carrier to the input signal; and means for detecting the signal having the emphasized carrier output from said adding circuit, and wherein said carrier reproduction circuit comprises:

means for converting the signal from said reception circuit into a digital signal by sampling the signal at a sampling frequency which is N times a frequency of the carrier in the signal, and for outputting the resultant digital signal to N systems sequentially;

N adaptive filters, one of which is arranged for associated one of said N systems, for filtering an input signal; and output means for sequentially selecting signals output from said N adaptive filters, and for outputting the selected signal as a single signal.

A demodulation circuit according to a sixth aspect of the present invention comprises:

a reception circuit for receiving a radio signal;

a carrier reproduction circuit for reproducing a carrier of a reception signal of said reception circuit;

a first amplifier for generating a first reproduced carrier by amplifying the carrier, reproduced by said carrier reproduction circuit, by a first value;

a second amplifier for generating a second reproduced carrier by amplifying the carrier, reproduced by said carrier reproduction circuit, by a second value;

an adding circuit for adding said first reproduced carrier and the reception signal output from said reception circuit;

a subtraction circuit for obtaining the difference between said second reproduced carrier and the reception signal output by said reception circuit;

a first FM demodulation circuit for demodulating a signal output by said adding circuit;

a second FM demodulation circuit for demodulating a signal output by said subtraction circuit; and a processing circuit for generating and outputting a demodulated signal of the reception signal, by processing a signal output by said first FM demodulation circuit and a signal output by said second FM demodulation circuit, and said carrier reproduction circuit comprises:

means for generating a digital signal by sampling the reception signal, output by said reception circuit, at a sampling frequency which is N times a carrier frequency, and for outputting the sampled signal to N systems sequentially;

N adaptive filters each of which is arranged for corresponding one of said N systems for filtering an input signal; and output means for selecting a signal output by said N adaptive filters, and for outputting the selected signals as a single signal.

In the demodulation circuit according to the fifth and sixth aspects, said first value is $20 \cdot \log_{10}$ (k) dB, said second value is $20 \cdot \log_{10}$ (k+2) dB, for example, and "k" is a positive real number.

DETAILED DESCRIPTION OF THE PREFERRED EMBODIMENT

A digital filter system according to the embodiments of the present invention now will be described.

First Embodiment

Figure 2:
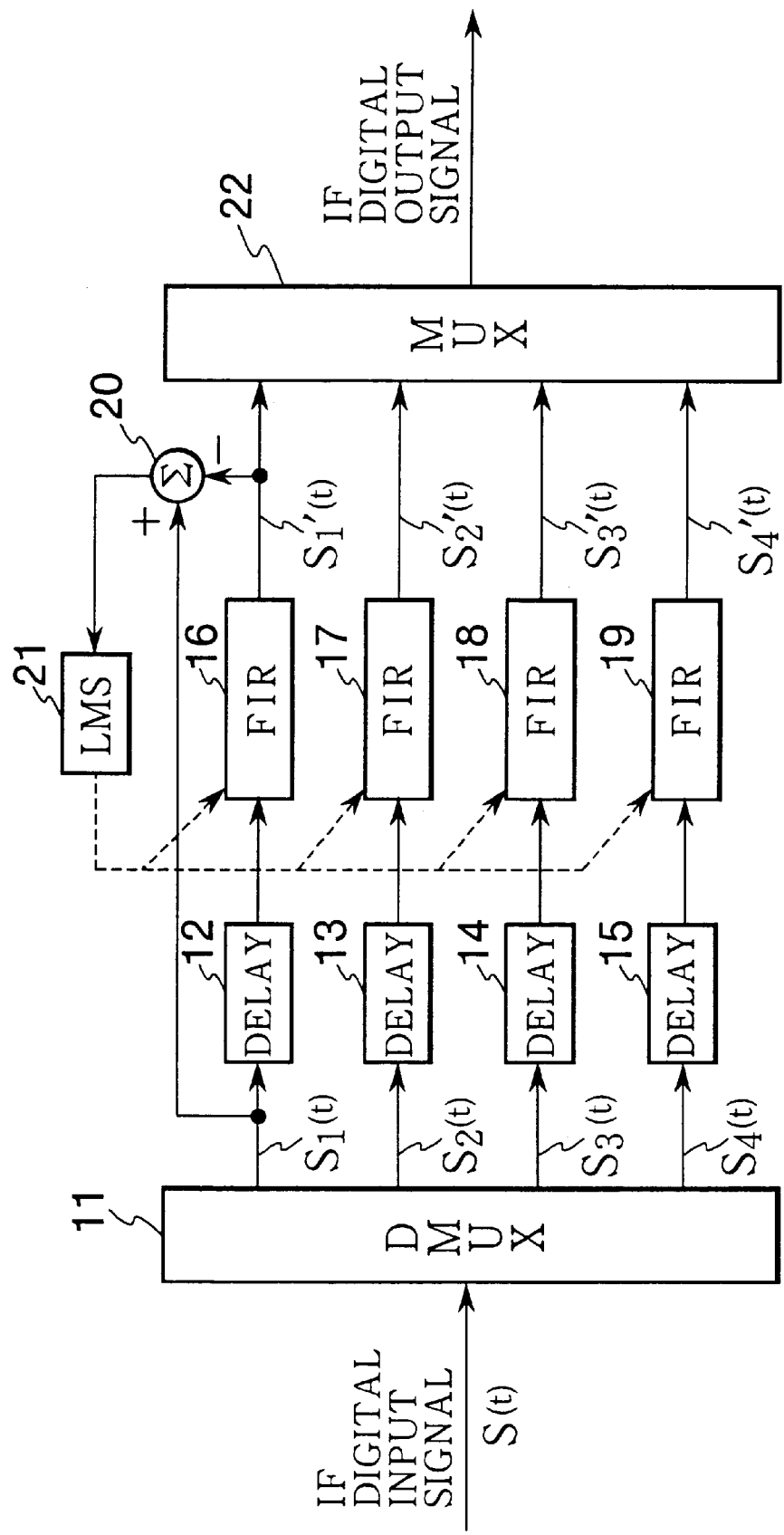
FIG. 2 is a block diagram illustrating the structure of a digital filter system of an embodiment of the present invention.

FIG. 2 shows the filter system according to the first embodiment of the present invention. The filter system is comprised of a demultiplexer (DMUX) 11, first to fourth delay circuits (DELAY) 12 to 15, first to fourth adaptive filters (FIR) 16 to 19, a subtracter 20, a controller (LMS) 21, and a multiplexer (MUX) 22.

The demultiplexer 11 outputs each signal segment (data item) of a digital input signal S(t) of an intermediate frequency as digital signals $S_1(t)$ to $S_4(t)$ from first to fourth output terminals sequentially. The digital input signal S(t) is a signal obtained by A/D conversion after sampling an IF analog signal, whose carrier frequency (frequency of the carrier signal) is $f_c$ (15.625 kHz, for example), at a sampling clock having a frequency $f_s$ which is four times $f_c$.

The first to fourth delay circuits 12 to 15 delay for a specific time the digital signals $S_1(t)$ to $S_4(t)$ output at the first to fourth output terminals of the demultiplexer 11.

The first to fourth adaptive filters 16 to 19, each of which have a plurality of taps, are filters to change the center frequency of the passband and the width of the passband in accordance with coefficients (tap coefficients) provided to the taps by the controller 21. Each of the first to fourth adaptive filters 16 to 19 attenuate unwanted (noise) components of the digital signals $S_1(t)$ to $S_4(t)$ output from the first to fourth delay circuits 12 to 15, and outputs digital signals $S_1'(t)$ to $S_4'(t)$.

The subtracter 20 subtracts the output $S_1'(t)$ of the first adaptive filter 16 from the digital output signal $S_1(t)$ of the first output terminal of the demultiplexer 11 in order to control the characteristics of the first to fourth adaptive filters 16 to 19. The controller 21 controls the tap coefficients of each of the adaptive filters 16 to 19, for appropriately canceling noise in accordance with a known LMS (Least Mean Square) algorithm based on data output from the subtracter 20.

The multiplexer 22 sequentially selects each data item (signal segment) for the digital signals $S_1'(t)$ to $S_4'(t)$ passed through the first to fourth adaptive filters 16 to 19, and outputs the selected signal as a single digital IF signal (data sequence).

The operation of the filter system in the structure shown in FIG. 2 now will be described.

The IF digital input signal S(t) which is supplied to the demultiplexer 11 is represented by equation (1). In equation (1), "$x_i$" indicates i-th piece of data of the IF digital input signal.

$$S(t)=x_1, x_2, x_3, x_4 \ldots x_i \ldots \qquad (1)$$

The demultiplexer 11 outputs the signal S(t) to the first to fourth output terminals in order. Therefore, data $x_1, x_5, x_9 \ldots$ are output from the first output terminal sequentially; data $x_2, x_6, x_{10} \ldots$ are output from the second 10 output terminal sequentially; data $x_3, x_7, x_{11} \ldots$ are output from the third output terminal; and data $x_4, x_8, x_{12} \ldots$ are output from the fourth output terminal sequentially.

Therefore, the first to fourth output signals $S_1(t)$, $S_2(t)$, $S_3(t)$, $S_4(t)$ are represented by equations (2) to (5).

$$S_1(t)=x_1, x_5, x_9 \ldots \qquad (2)$$

$$S_2(t)=x_2, x_6, x_{10} \ldots \qquad (3)$$

$$S_3(t)=x_3, x_7, x_{11} \ldots \qquad (4)$$

$$S_4(t)=x_4, x_8, x_{12} \ldots \qquad (5)$$

The sampling frequency $f_s$ is four times the carrier frequency $f_c$ of the analog input signal and, further, the signal is output to four systems in parallel. Therefore, the first to fourth signals $S_1(t)$ to $S_4(t)$ are sampling signals having substantially same phase in regard to the carrier. Therefore, the first to fourth signals $S_1(t)$ to $S_4(t)$ are so called zero carriers, whose carrier frequency is substantially zero, and substantially become signals at AF band. For example, if the IF digital input signal S(t) is an SSB signal represented by equation (6), the first to fourth signals $S_1(t)$ to $S_4(t)$ are represented by equations (7) to (10). The signals $S_1(t)$ to $S_4(t)$, represented by equations (7) to (10), are comprised of signal g(t) at the AF band and signal $g^\#(t)$, which is a Hilbert transformation of the signal g(t). Therefore, it is obvious that the signals $S_1(t)$ to $S_4(t)$ are AF band signals.

$$S(t)=g(t)\cdot\cos(2\cdot\pi\cdot f_c\cdot i/f_s)+g^\#(t)\cdot\sin(2\cdot\pi\cdot f_c\cdot i/f_s) \qquad (6)$$

$$S_1(t)=\{g^\#(1), g^\#(5), g^\#(9), \ldots\} \qquad (7)$$

$$S_2(t)=\{-g(2), -g(6), -g(10), \ldots\} \qquad (8)$$

$$S_3(t)=\{-g^\#(3), -g^\#(7), -g^\#(11), \ldots\} \qquad (9)$$

$$S_4(t)=\{g(4), g(8), g(12), \ldots\} \qquad (10)$$

Each of the signals $S_1(t)$ to $S_4(t)$ has the same frequency and the same amplitude, but only their phases are different from each other.

The first to fourth delay circuits 12 to 15 delay the signals $S_1(t)$ to $S_4(t)$ for a specific time to cancel noise having no periodicity.

The first to fourth adaptive filters 16 to 19 cancel unwanted components in the delayed first to fourth signals and output the filtered signals.

Because the input signals are zero carriers, the first to fourth adaptive filters 16 to 19 are the digital filters having a passband at the AF band. The first to fourth adaptive filters 16 to 19 attenuate unwanted signals and pass objective (target) signals at the AF band. The characteristics of the first to fourth adaptive filters 16 to 19 are determined by the tap coefficients set by the controller 21. The same tap coefficients are set at the first to fourth adaptive filters 16 to 19 by the controller 21. Therefore, the adaptive filters 16 to 19 have the same characteristics each other.

The subtracter 20 obtains the difference between the output signal S1(t) from the first output terminal of the demultiplexer 11 and the output signal of the first adaptive filter 16. The controller 21 controls (adjusts) the tap coefficients of the first to fourth adaptive filters 16 to 19 in accordance with the signal supplied from the subtracter 20, based on a known LMS algorithm. Therefore, the characteristics of the first to fourth adaptive filters 16 to 19 are controlled dynamically in accordance with the noise condition, and noise components of the input signals are canceled appropriately.

The multiplexer 22 sequentially selects the output data of the first to fourth adaptive filters 16 to 19, and outputs the selected signal as a single signal in series. That is, if data items (signal segments) output from the first adaptive filter 16 are represented as $X_1', X_5', \ldots$, data output from the second adaptive filter 17 are represented as $X_2', X_6', \ldots$, data output from the third adaptive filter 18 are represented as $X_3', X_7', \ldots$, and data output from the fourth adaptive filter 19 are represented as $X_4', X_8', \ldots$, the multiplexer 22 selects each data item sequentially and outputs all of them as $X_1', X_2', X_3', X_4', X_5', X_6', \ldots$ The signal which is comprised of data output from the multiplexer 22, that is a noise canceled signal, is an intermediate frequency signal.

As described above, according to this embodiment, noise can be canceled at the IF stage by using the adaptive filters 16 to 19. The adaptive filter for the AF stage can be used as the adaptive filters 16 to 19. As known in general, producing an adaptive filter for a higher frequency is more difficult than producing an adaptive filter for a lower frequency, and therefore an adaptive filter for a higher frequency is expensive. According to this embodiment, because the noise can be canceled by using the adaptive filter for the AF band, the cost of the adaptive filter can be reduced.

The structure of this embodiment may be comprised of the DSP (Digital Signal Processor) instead of the individual parts represented by the demultiplexer 11 to the multiplexer 22. In this case, the demultiplexer 11 through the multiplexer 22 are comprised of each module which executes digital signal processing in the DSP.

Although the BPF is used as the adaptive filter in this embodiment, a notch filter can be used which attenuate only signals whose predetermined frequency band width is relatively narrow and allows other wide band signals to pass.

Figure 3:
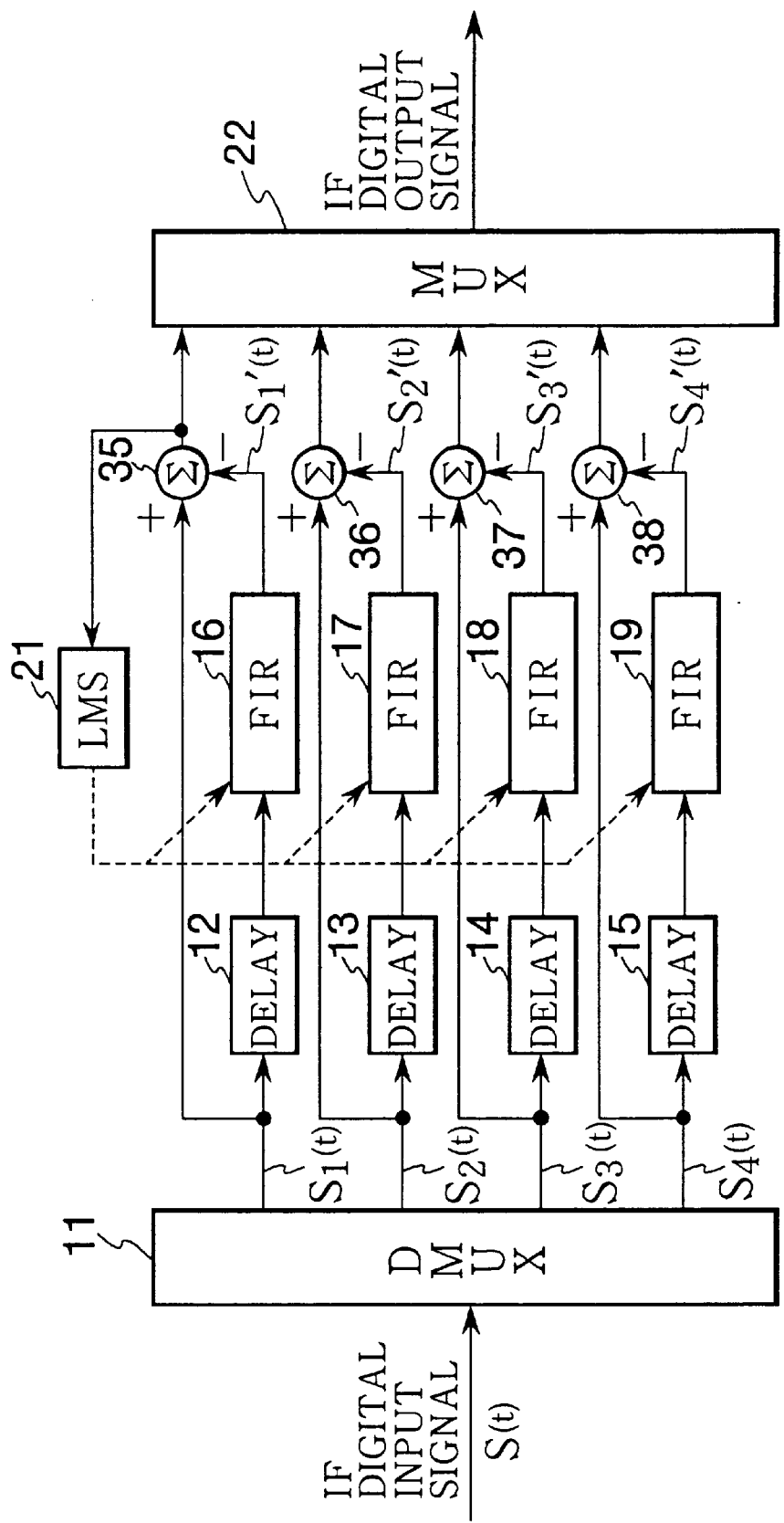
FIG. 3 is a block diagram illustrating the structure of a digital notch filter system of another embodiment of the present invention.

FIG. 3 shows the circuit structure when a notch filter system is formed with the adaptive filter. Like or the same reference numerals as used in FIG. 2 are also used in FIG. 3 to denote corresponding or identical components.

In this circuit, the difference between the first output signal $S_1(t)$ from the demultiplexer 11 and the output signal $S_1'(t)$ of the first adaptive filter 16 is obtained by the first subtracter 35, and the obtained data (difference data) is input to the multiplexer 22. In the same manner, the differences among the second to the fourth output signals $S_2(t)$ to $S_4(t)$ from the demultiplexer 11, and the output signals $S_2'(t)$ to $S_4'(t)$ of the second to the fourth adaptive filters 17 to 19 are obtained by the second to the fourth subtracters 36 to 38, and the obtained difference data are input to the multiplexer 22.

The controller 21 controls the tap coefficients of the adaptive filters 16 to 19 in accordance with an LMS algorithm based on the output signal of the first subtracter 35. In such a structure, only the unnecessary components having large periodicity, extracted from the input signals to be $S_1'(t)$ to $S_4'(t)$ by the adaptive filters 16 to 19. The unnecessary component signals $S_1'(t)$ to $S_4'(t)$ are subtracted from the output signals $S_1(t)$ to $S_4(t)$ output from the demultiplexer 11. Therefore, only the unnecessary components may be attenuated. Therefore, the filter system shown in FIG. 3 functions as a notch-filter.

Although FIGS. 2 and 3 exemplify the system where the present invention is adapted for a TDADF (Time Division Adaptive Digital Filter), the present invention is not limited to that, and can be adapted for a TD-CDADF (Time Division-Coefficients Division Adaptive Digital Filter), or the like.

Figure 4:
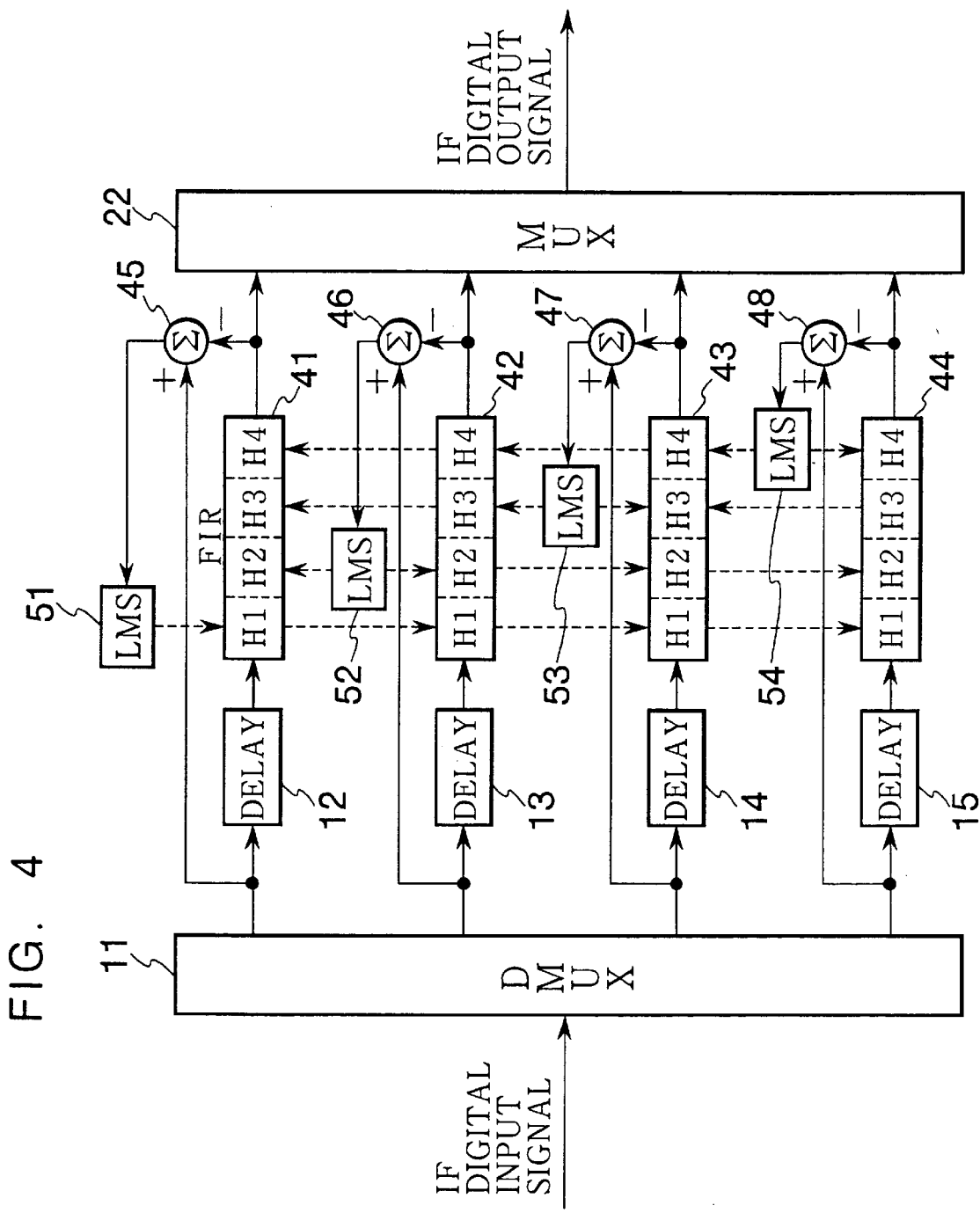
FIG. 4 is a block diagram illustrating the structure of a variation of the digital filter system shown in FIG. 2.

FIG. 4 exemplifies the present invention adapted for a TD-CDADF.

In this structure, the tap coefficients of the first to the fourth adaptive filters 41 to 44 comprised of BPFs are divided into four groups H1 to H4, respectively.

The subtracter 45 obtains the difference between the first output signal $S_1(t)$ from the demultiplexer 11 and the output signal $S_1'(t)$ from the first adaptive filter 41. The controller 51 controls the first tap coefficient groups H1 of the first to the fourth adaptive filters 41 to 44 in accordance with an LMS algorithm based on the difference.

The subtracter 46 obtains the difference between the second output signal $S_2(t)$ from the demultiplexer 11 and the output signal $S_2'(t)$ from the second adaptive filter 42. The controller 52 controls the second tap coefficient groups H2 of the first to the fourth adaptive filters 41 to 44 in accordance with an LMS algorithm based on the difference.

The subtracter 47 obtains the difference between the third output signal $S_3(t)$ from the demultiplexer 11 and the output signal $S_3'(t)$ from the third adaptive filter 43. The controller 53 controls the third tap coefficient groups H3 of the first to the fourth adaptive filters 41 to 44 in accordance with an LMS algorithm based on the difference.

The subtracter 48 obtains the difference between the fourth output signal $S_4(t)$ from the demultiplexer 11 and the output signal $S_4'(t)$ from the fourth adaptive filter 44. The controller 54 controls the fourth tap coefficient groups H4 in accordance with an LMS algorithm based on the difference.

According to the structure shown in FIG. 4, a filter system for which less amount of processing is required than is required for one whose structure uses the TDADF shown in FIGS. 2 and 3 can be comprised. For example, when the filter system is comprised of the digital signal processor (TMS320C25), and the number of the tap coefficients is set to 16, the number of calculations required for the AF band is 11.25 MIPS (Million Instructions Per Second). Approximately the same number of calculations are needed for the above mentioned system using the TDADF. When a TD-CDADF is used, however, the structure requires 6.75 MIPS.

An example of a radio receiver using these filter systems will now be described while referring to FIG. 5 as an application example for the filter systems having the structures described above.

The radio receiver is comprised of an antenna 61, a tune/frequency conversion section 62, an A/D converter 63, a filter system 64, a detection circuit 65, a D/A converter 66, an amplifier 67, and a loudspeaker 68.

The tune/frequency conversion section 62 selectively converts an RF (Radio Frequency) signal received by the antenna 61, to an IF (Intermediate Frequency) signal. The IF signal output from the tune/frequency conversion section 62 is subjected to A/D conversion by the A/D converter 63. The filter system 64, having the structure shown in FIGS. 2 to 4, cancels the noise in the output signal of the A/D converter 63. The detection circuit 65 detects the output signal (IF signal) from the filter system 64, and outputs an obtained AF signal. The AF signal output from the detection circuit 65 is subjected to D/A conversion and output by the D/A converter 66. The amplifier 67 amplifies the analog audio signal output from the D/A converter 66. The loudspeaker 68 is driven by the output of the amplifier 67 and produces the demodulated sound.

Figure 5:
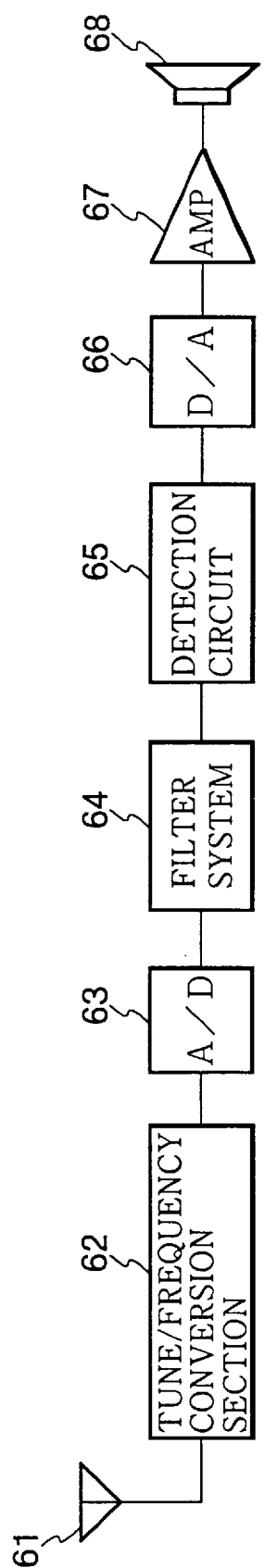
FIG. 5 is a block diagram exemplifying the structure of a receiver using the digital filter system shown in FIGS. 2 to 4.

According to the structure shown in FIG. 5, data processing with less noise influence can be performed because the noise is canceled by the filter system 64 at the IF stage, and the detection, D/A conversion, amplification or the like are performed, thereafter.

The result of the comparison of the convergence characteristics of a filter system using the conventional processing for the AF band, and the convergence characteristics of a filter system using a TDADF and a TD-CDADF for the processing for the IF band obtained by using the computer simulation will now be given.

Conditions of the Simulation

Figure 6:
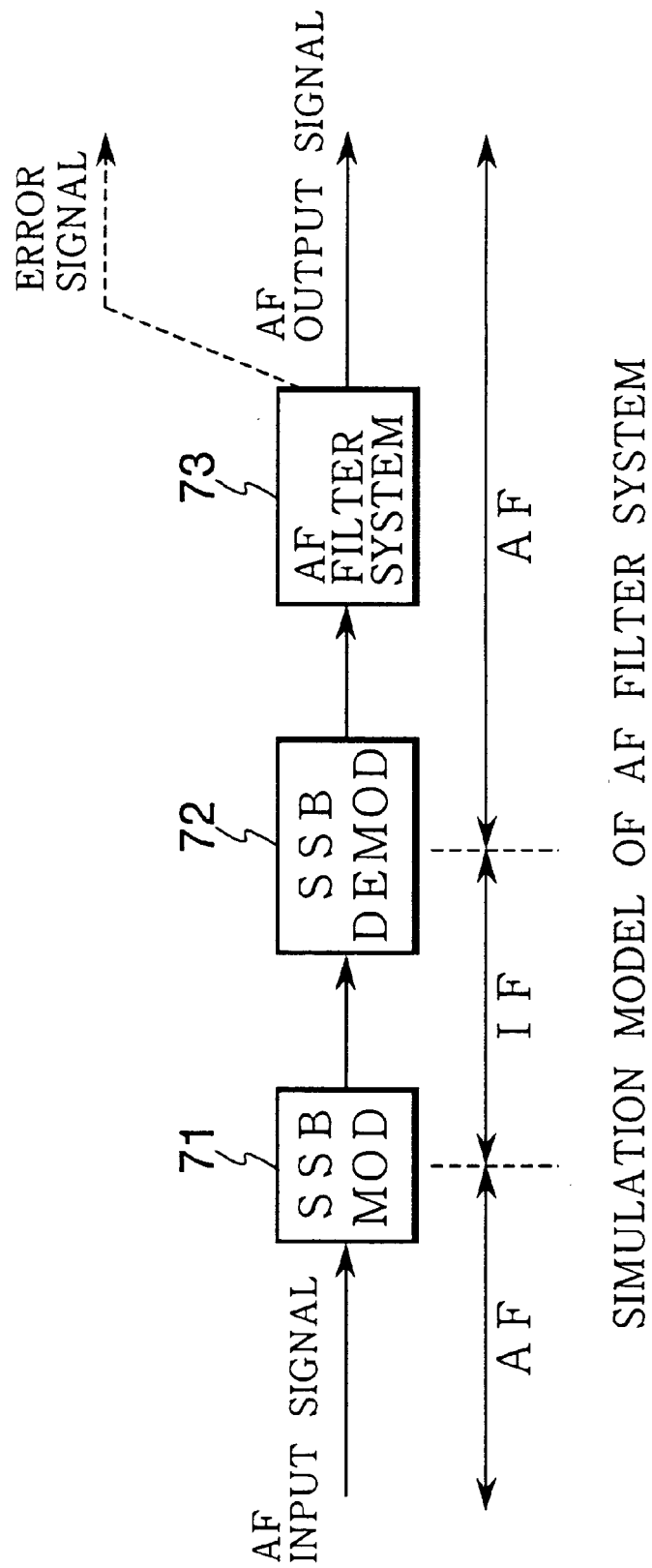
FIG. 6 is a block diagram showing the structure of a circuit for evaluating the characteristics of the filter system shown in FIG. 1.
Figure 7:
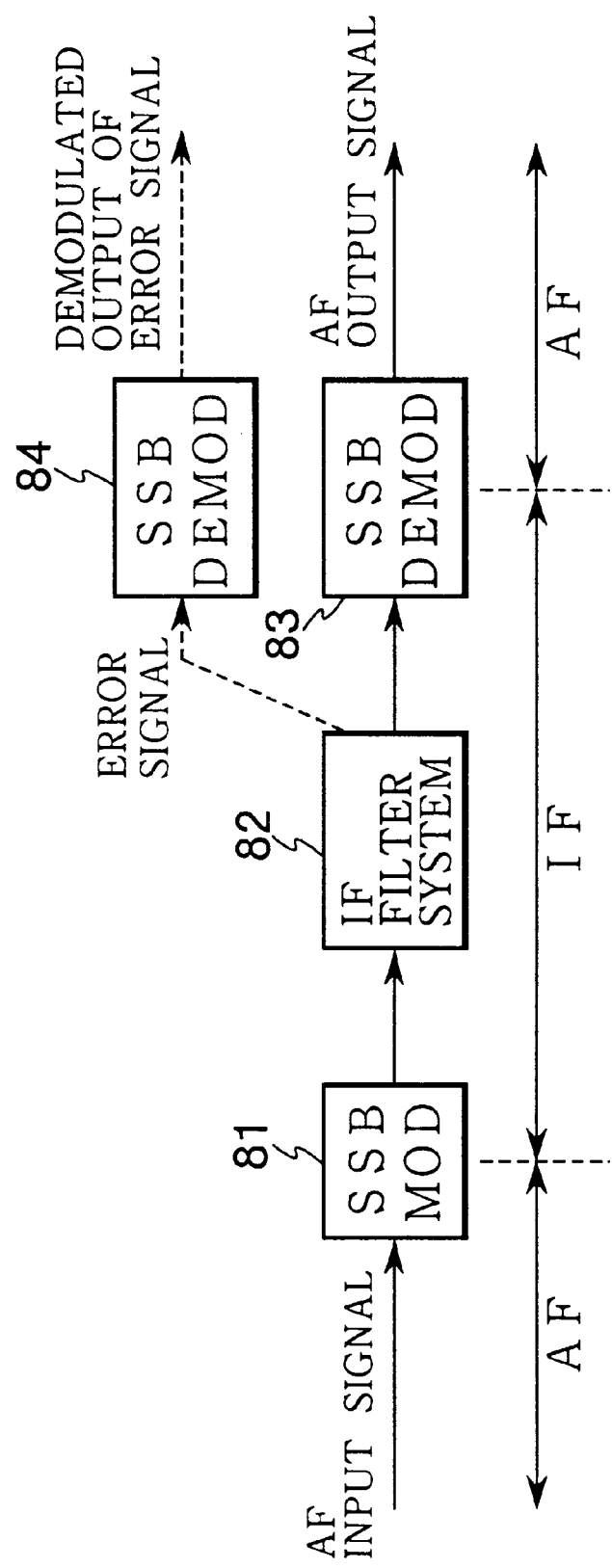
FIG. 7 is a block diagram showing the structure of a circuit for evaluating the characteristics of the filter systems shown in FIGS. 2 to 4.

A model shown in FIG. 6 is used for the filter system for the AF band, and a model shown in FIG. 7 is used for the filter system for the IF band in order to compare the filter system for the AF band with the filter system for the IF band.

Figure 1:
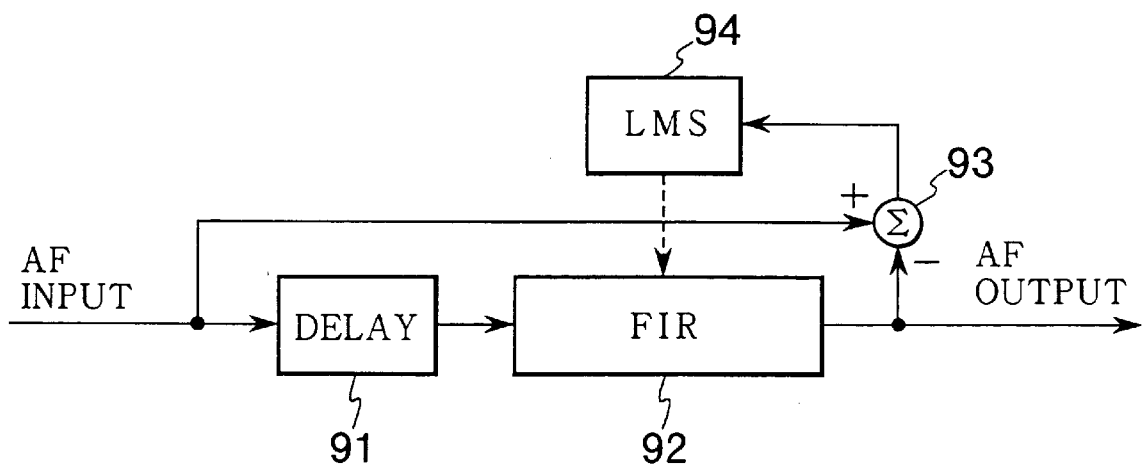
FIG. 1 is a block diagram showing the structure of the adaptive filter system disclosed in U.S. patent application Ser. No. 08/452,282.

That is, according to the simulation model for the AF band, an SSB modulator (MOD) 71 modulates an AF input signal to obtain the IF signal as shown in FIG. 6, and an AF signal is obtained by demodulating the IF signal using an SSB demodulator (DEMOD) 72. The AF signal is supplied to the AF filter system 73 shown in FIG. 1. As a result, an AF output signal and an error signal are obtained.

On the other hand, according to the simulation model for the IF band, an SSB modulator (MOD) 81 modulates the AF input signal to obtain the IF signal, as shown in FIG. 7, and the IF signal is supplied to the IF filter system 82 having the structure shown in FIGS. 2 or 4. An AF output signal is obtained by demodulating the output signal of the IF filter system 82 using an SSB demodulator (DEMOD) 83. Because an error signal output by the IF filter system is also an IF signal, a demodulated signal is obtained from the error signal by supplying the error signal to an SSB demodulator (DEMOD) 84.

Input signal comprises tone signals of 1 kHz and 2.4 kHz to which white noise is added. The simulation is performed for two cases, where the SNR (Signal-to-Noise Ratio) is 24 dB and where the SNR is 10 dB. For evaluating the convergence characteristics, variable err(t) which is defined by equation (11) is used.

$$\text{err}(t) = E[20 \cdot \log_{10}|Er(i)|](t \leq i \leq t+500) \tag{11}$$

where $E[\cdot]$ is the expectation of a random variable. In this simulation, "i" indicates expectation from (t) to (t+500).

For the AF band, Er represents the error signal. For the IF band, however, Er represents the demodulated error signal because the error signal is the IF signal.

The values in TABLE 1 are used for the number of the taps for each adaptive filter, step parameters, and delay time for the delay circuit to comprise the noise filter system for the AF band and the noise filter system for the IF band.

TABLE 1

|  | number of taps | Delay time | step parameters |
| --- | --- | --- | --- |
| AF NR | 32 | 32 | 0.005 |
| IF NR(TDAPF) | 32 | 8 | 0.03 |
| IF NR(TD-CDAPF) | 32 | 8 | 0.03 |

AF: Filter system for AF band
TDADF: TDADF filter system for IF band
TD-CDADF: TD-CDADF filter system for IF band Result of the Simulation FIG. 8 shows the variable err(t) when the SNR of the input signal was set to 24 dB, and FIG. 9 shows the variable err(t) when the SNR was set to 10 dB under the conditions described above.

Figure 8:
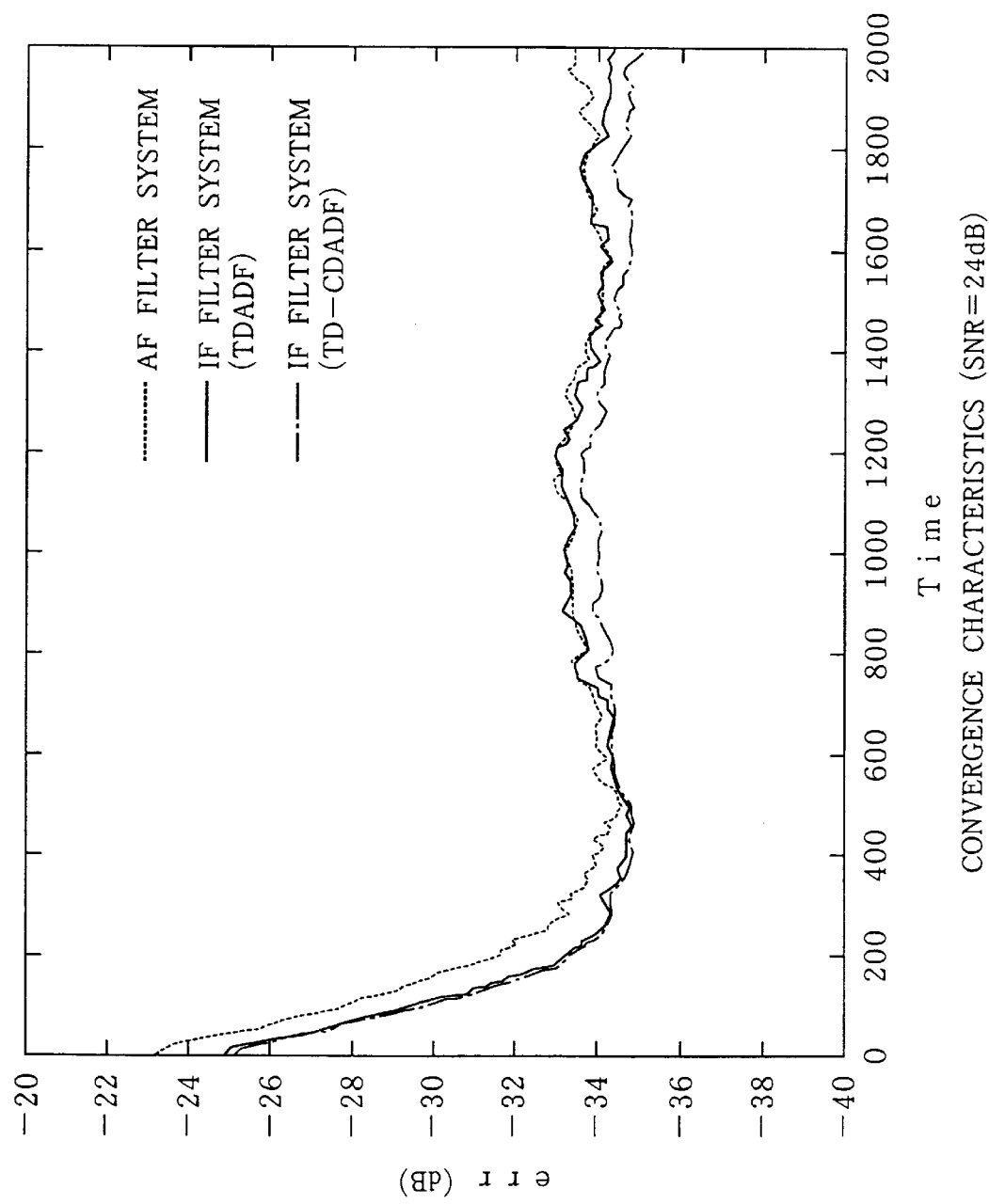
FIG. 8 is a graph showing the result of convergency characteristic simulation of the filter systems for the circuits shown in FIGS. 6 and 7.
Figure 9:
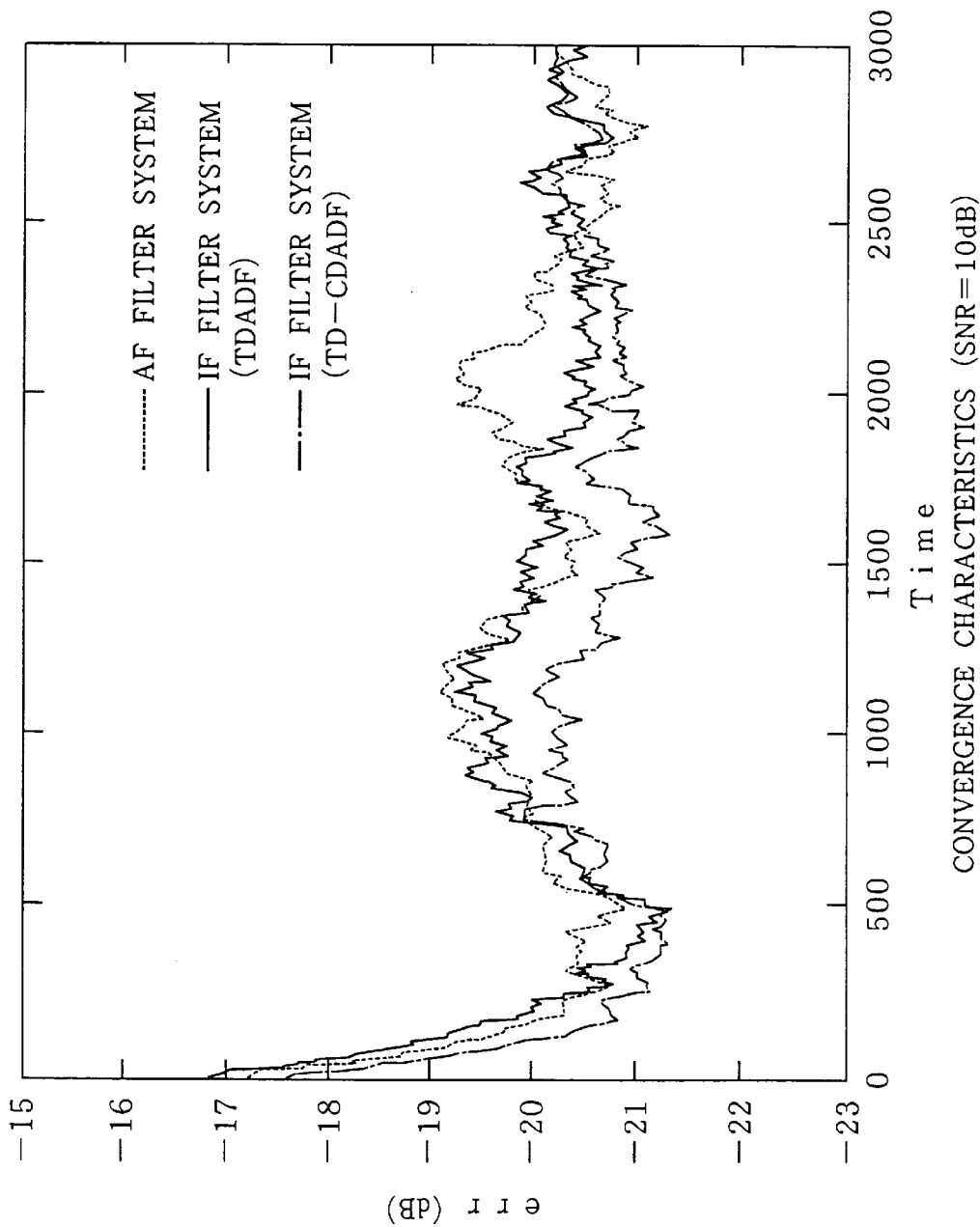
FIG. 9 is a graph showing the result of convergency characteristic simulation of the filter systems for the circuits shown in FIGS. 6 and 7.

From FIGS. 8 and 9, it can be seen that the TD-CDADF filter system converges faster than the others. When the SNR=24 dB, the convergence characteristics of the TDADF filter system approximately equals that of the TD-CDADF; when the SNR=10 dB, however, the speed of the convergence of the TDADF filter system is slower than that of the filter system for the AF band.

Accordingly, it is confirmed that the TD-CDADF filter system is an effective technique because it has the fastest convergence, and because it requires less processing.

The present invention is not limited to the embodiment described above, various adaptations and alterations are possible. For example, although the sampling frequency fs is set to four times the carrier frequency of the analog input signal and the digital signal after A/D conversion and is divided into four systems by the demultiplexer 11, the sampling frequency may be set to N times (N is a positive integer equal to or greater than four) the carrier frequency of the analog input signal, and the digital signal after A/D conversion, may be divided into N systems by the demultiplexer. Moreover, the circuit structure or the like may be modified arbitrarily.

As described above, according to the first embodiment of the present invention, noise can be reduced dynamically by using the adaptive filter at the intermediate frequency stage. Moreover, because the adaptive filter itself may be one for the audio frequency band, high performance filters can be used easily.

Second Embodiment

A high performance carrier reproduction circuit can be provided by using the digital filter system of the first embodiment.

A carrier reproduction circuit according to this embodiment of the present invention will be described while referring to the accompanying drawings.

To begin, a carrier reproduction circuit with the digital filter system shown in FIG. 2 will be described while referring to FIG. 10.

The structure of the carrier reproduction circuit includes an A/D converter 101 at the preceding stage of the demultiplexer 11 shown in FIG. 2 and a D/A converter 102 at the following stage of the multiplexer 22.

An analog intermediate signal (IF signal), including a carrier, is supplied to the A/D converter 101. The A/D converter 101 samples the IF signal at a sampling frequency $f_s$ which is four times a carrier frequency $f_c$ (15.625 kHz, for example) in the IF signal. The D/A converter 102, then, converts data sequentially supplied from a multiplexer 22 sequentially into analog signals. The D/A converter 102 may be arranged as needed.

The operation performed by the circuits, from the demultiplexer 11 to the multiplexer 22, is the same as the operation performed by the circuits comprising the digital filter system shown in FIG. 2.

The carrier reproducing operation performed by the carrier reproduction circuit having the structure shown in FIG. 10 now will be described.

The sampling frequency $f_s$ is four times the carrier frequency $f_c$ of the analog IF signal. The demultiplexer 11 outputs the data from the A/D converter 101 to four systems cyclically. Therefore, as described in the first embodiment, the first to the fourth signals $S_1(t)$ to $S_4(t)$ ideally become signals sampled at the same phase and the carrier becomes direct current components. Actually, however, there is a little difference between the sampling frequency and the value which is four times the carrier frequency. Therefore, the carrier is converted into a signal having low frequency components, that is, a low frequency sine signal.

It is possible to extract such a signal having low frequency components by an LPF (Low Pass Filter). However, the amount of shift of the carrier frequency is changed dynamically in accordance with a change in the transmission condition, or the like. A normal LPF can not follow the change in the amount of drift. Therefore, the adaptive filters 16 to 19, whose characteristics are controlled based on an LMS algorithm, are used in this embodiment to extract a signal having low frequency components.

To cancel noise having no periodicity, the first to the fourth delay circuits 12 to 15 delay for a specific time the signals $S_1(t)$ to $S_4(t)$ output from the demultiplexer 11.

The predetermined frequency components of the first to the fourth signals $S_1(t)$ to $S_4(t)$, that are delayed, pass through the first to fourth adaptive filters 16 to 19, and other frequency components are attenuated. The characteristics of the attenuation are determined by the tap coefficients set by the controller 21. The controller 21 sets the same tap coefficients to the first to the fourth adaptive filters 16 to 19. Therefore, the first to fourth adaptive filters 16 to 19 have the same characteristics each other.

The subtracter 20 obtains the difference (error signal) between the output signal $S_1(t)$ from the first output terminal of the demultiplexer 11, and the output signal $S_1'(t)$ from the first adaptive filter 16. That is, the subtracter 20 processes the signals which differ in regard to time. Therefore, the error signal becomes a noise component without periodicity.

The controller 21 controls (adjusts) the tap coefficients of the first to fourth adaptive filters 16 to 19 in accordance with the periodicityless error signal based on a known LMS algorithm. Therefore, the characteristics of the first to fourth adaptive filters 16 to 19 are controlled dynamically in accordance with the input signal, and the first to fourth adaptive filters 16 to 19 cancel the periodicityless signal components and extract a signal having periodicity (a signal having a strong correlation), that is, the first to fourth adaptive filters 16 to 19 extract the carrier which is a sine wave signal.

The multiplexer 22 selects the data output from the first to fourth adaptive filters 16 to 19 sequentially, and outputs the selected data as a single signal, and reconstructs the carrier component. That is, the carrier is reconstructed by outputting the carrier sampled at the different phases sequentially.

The adaptive filters 16 to 19 attenuate the noise components having no periodicity in the signals $S_1(t)$ to $S_4(t)$, based on the subtracter 20, to pass the carrier components. Therefore, pure carriers can be reproduced mostly by multiplexing the outputs $S_1'(t)$ to $S_4'(t)$ of the adaptive filters 16 to 19 by the multiplexer 22.

The signals having the periodicity pass through the first to fourth adaptive filters 16 to 19. Therefore, when the carrier frequency shifts (drifts), the signal with shifted frequency passes the filter. Because the carrier itself in the input signal is reproduced, the phase difference does not occur. Therefore, the frequency and phase of the carrier can be reproduced exactly.

The reproduced carrier output by the multiplexer 22 is converted into the analog signal by the D/A converter 102 as needed.

As described above, according to this embodiment, a carrier whose frequency and phase are reproduced correctly can be obtained by using the digital filter system shown in FIG. 2.

The same as in the first embodiment, the circuits from the demultiplexer 11 through the multiplexer 22 do not have to be comprised of discrete parts. For example, they may be comprised of the DSP (Digital Signal Processor), or the like.

The carrier reproduction circuit also may be comprised of the digital filter system shown in FIG. 4.

Figure 11:
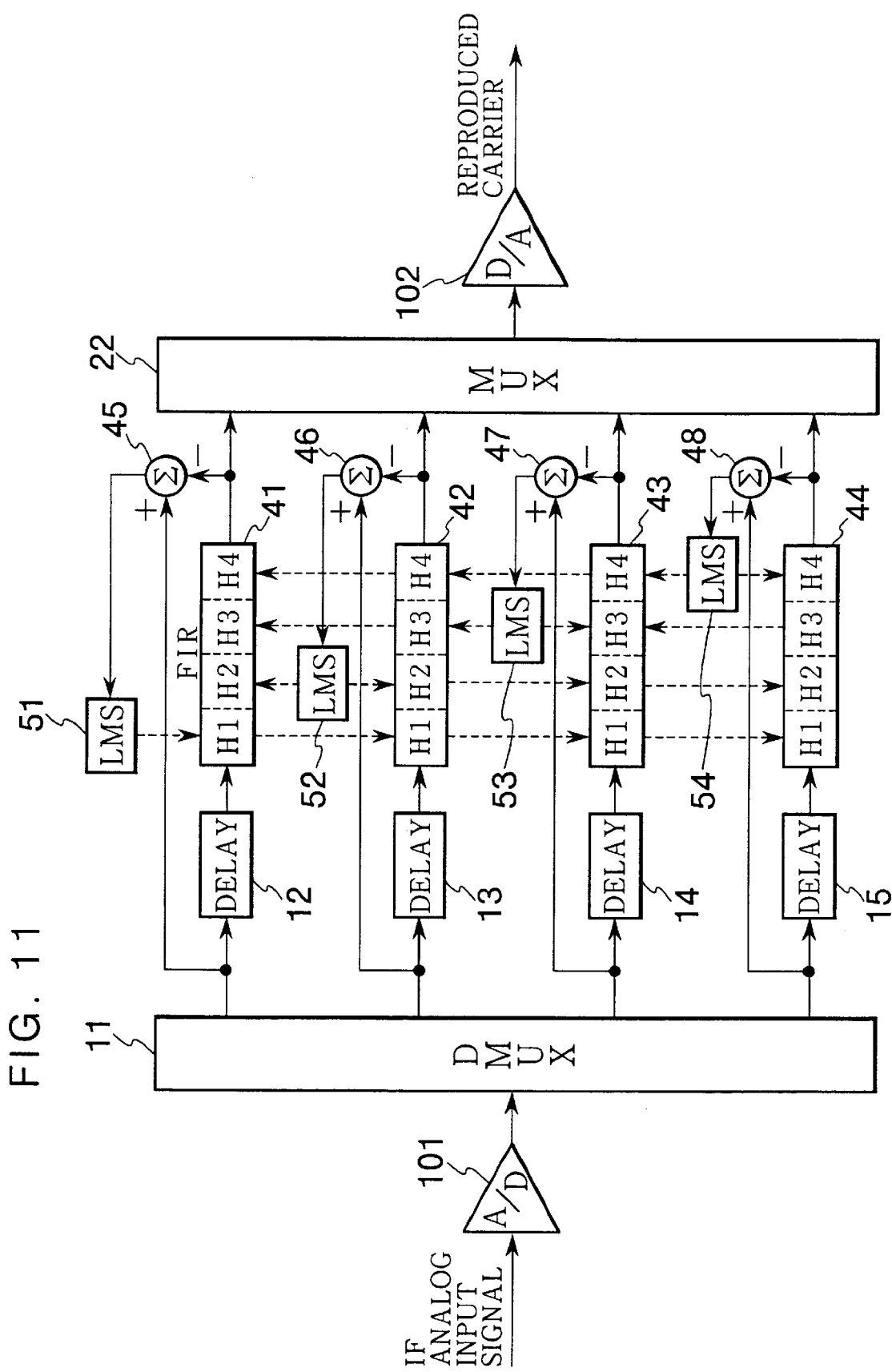
FIG. 11 is a block diagram of a variation of the carrier reproduction circuit shown in FIG. 10.

FIG. 11 shows the circuit structure of the carrier reproduction circuit using the digital filter system shown in FIG. 4.

In this structure, the A/D converter 101 samples the input signal at a frequency which is four times the carrier frequency of the input analog signal.

The filter system which receives the digitalized signal from the A/D converter 101 cancels the noise components and outputs the carrier components having the periodicity.

The reproduced digital carrier is converted into an analog signal by the D/A converter 102 as needed.

Figure 10:
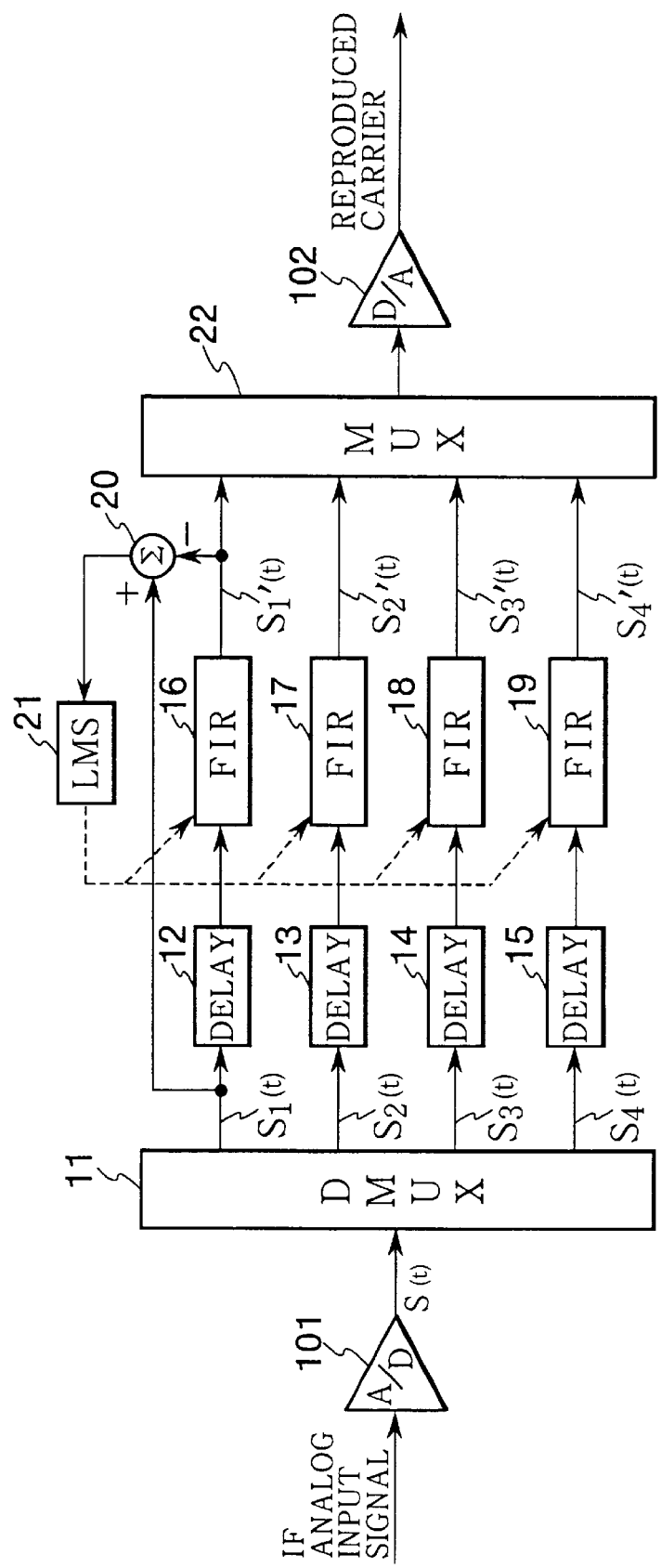
FIG. 10 is a block diagram of a carrier reproduction circuit according to the second embodiment of the present invention.

According to the filter systems shown in FIGS. 10 and 11, although the sampling frequency $f_s$ is four times the carrier frequency $f_c$ and the digital signal after A/D conversion is divided by the demultiplexer into four systems, the sampling frequency $f_s$ may be N (a positive integer equal to or greater than 4) times the carrier frequency $f_c$ of the analog input signal and the digital signal after A/D conversion may be divided by the demultiplexer into N systems.

As described above, the carrier reproduction circuit shown in FIGS. 10 and 11 can reproduce the frequency and phase of the carrier exactly. Therefore, an RZSSB signal or the like can be demodulated without a linearizer by using the carrier reproduced by these carrier reproduction circuits.

The example of a demodulator using the carrier reproduced by the carrier reproduction circuit with the structure shown in FIGS. 10 or 11 will now be described while referring to FIG. 12.

Figure 12:
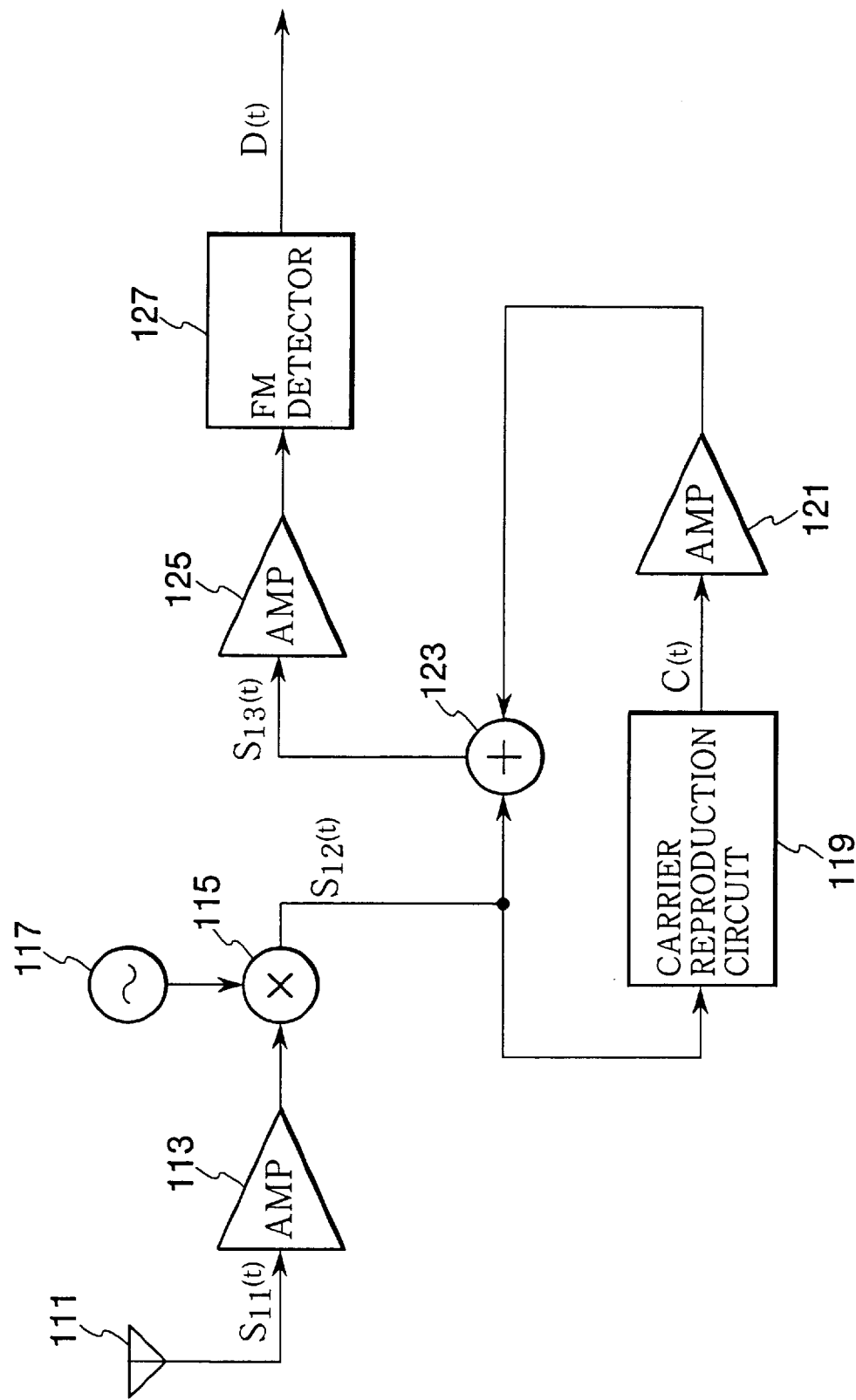
FIG. 12 is a block diagram of a demodulation circuit using the carrier reproduction circuit shown in FIGS. 10 or 11.

In FIG. 12, a signal $S_{11}(t)$ supplied from an antenna 111 is amplified by an amplifier 113 and mixed with a local signal Lo supplied from a local oscillator 117 by a mixer 115. As a result, the signal $S_{11}(t)$ is converted into intermediate frequency signal $S_{12}(t)$.

The intermediate frequency signal $S_{12}(t)$ is supplied to the carrier reproduction circuit 119. The carrier reproduction circuit 119 has the structure shown in FIGS. 10 or 11 and reproduces a carrier C(t) from the intermediate frequency signal $S_{12}(t)$. An amplifier 121 amplifies the amplitude of reproduced carrier C(t) p times and outputs the amplified signal.

An adding circuit 123 adds the amplified reproduced carrier p·C(t) supplied from the amplifier 121 and the intermediate frequency signal $S_{12}(t)$ supplied from the mixer 115, and outputs the obtained signal as a signal $S_{13}(t)$.

The output signal $S_{13}(t)$ is amplified by an amplifier 125 and is demodulated by an FM detection circuit 127.

The operation of the demodulation circuit shown in FIG. 12 will now be described.

The mixer 115 mixes the signal $S_{11}(t)$ received by the antenna 111 with the local signal Lo whose frequency is $f_o$, and outputs the intermediate frequency signal $S_{12}(t)$ represented by equation (12).

$$S_{12}(t) = (n + m \cdot g(t)) \cdot \cos(2 \cdot \pi \cdot f_c \cdot t) + m \cdot g^\#(t) \cdot \sin(2 \cdot \pi \cdot f_c \cdot t) \quad (12)$$

"$f_c$" represents the carrier frequency of the intermediate frequency signal $S_{12}(t)$, "n" and "m" represent the positive real numbers, and m/n represents the modulation degree.

When n is greater than m, the intermediate frequency signal $S_{12}(t)$ is an RZSSB, and when n is equal to m, the intermediate frequency signal $S_{12}(t)$ is a full carrier SSB, and when n is smaller than m, the intermediate frequency signal $S_{12}(t)$ is a reduced carrier SSB.

g(t) represents an objective (target) signal, and $g^\#(t)$ represents a signal which is Hilbert transformed objective signal g(t).

The carrier reproduction circuit 119 reproduces the carrier of the intermediate frequency signal $S_{12}(t)$ by the operation described above. The amplifier 121 amplifies the amplitude of the carrier p times. The reproduced carrier p·C(t) is represented as equation (13).

$$p \cdot C(t) = p \cdot n \cdot \cos(2 \cdot \pi \cdot f_c \cdot t) \quad (13)$$

The adding circuit 123 adds the reproduced carrier p·C(t) supplied from the amplifier 121 and the intermediate frequency signal $S_{12}(t)$ supplied from the mixer 115. The signal $S_{13}(t)$ output from the adding circuit 123 is represented by equation (14).

$$\begin{aligned} S_{13}(t) &= p \cdot C(t) + S_{12}(t) \\ &= p \cdot n \cdot \cos(2 \cdot \pi \cdot f_c \cdot t) + S_{12}(t) \\ &= \{n \cdot (p+1) + m \cdot g(t)\} \cdot \cos(2 \cdot \pi \cdot f_c \cdot t) + \\ &\quad m \cdot g^\#(t) \cdot \sin(2 \cdot \pi \cdot f_c \cdot t) \end{aligned} \quad (14)$$

The FM detection circuit 127 demodulates the signal $S_{13}(t)$ amplified by the amplifier 125 and outputs the demodulated signal D(t). The demodulated signal D(t) is represented by equation (15). It is apparent from equation (15), that the objective signal g(t) is demodulated.

$$D(t) = (m/(n \cdot p))g^\#(t) - (m/(n \cdot p))^2 \cdot g^\#(t) \cdot g(t) - (m/(n \cdot p))^3 \cdot \{g^{\#3}(t)/3 - g^{\#2}(t) \cdot g(t)\} + O((m/(n \cdot p))^4) \quad (15)$$

"$O((m/(n \cdot p))^4)$" is the total sum of the distortions whose orders are equal to or greater than four.

When the received signal is an FM signal, there is no distortion of the demodulated signal D(t).

The other structure of the demodulation circuit using the carrier reproduction circuit shown in FIGS. 10 and 11 now will be described while referring to FIG. 13.

Figure 13:
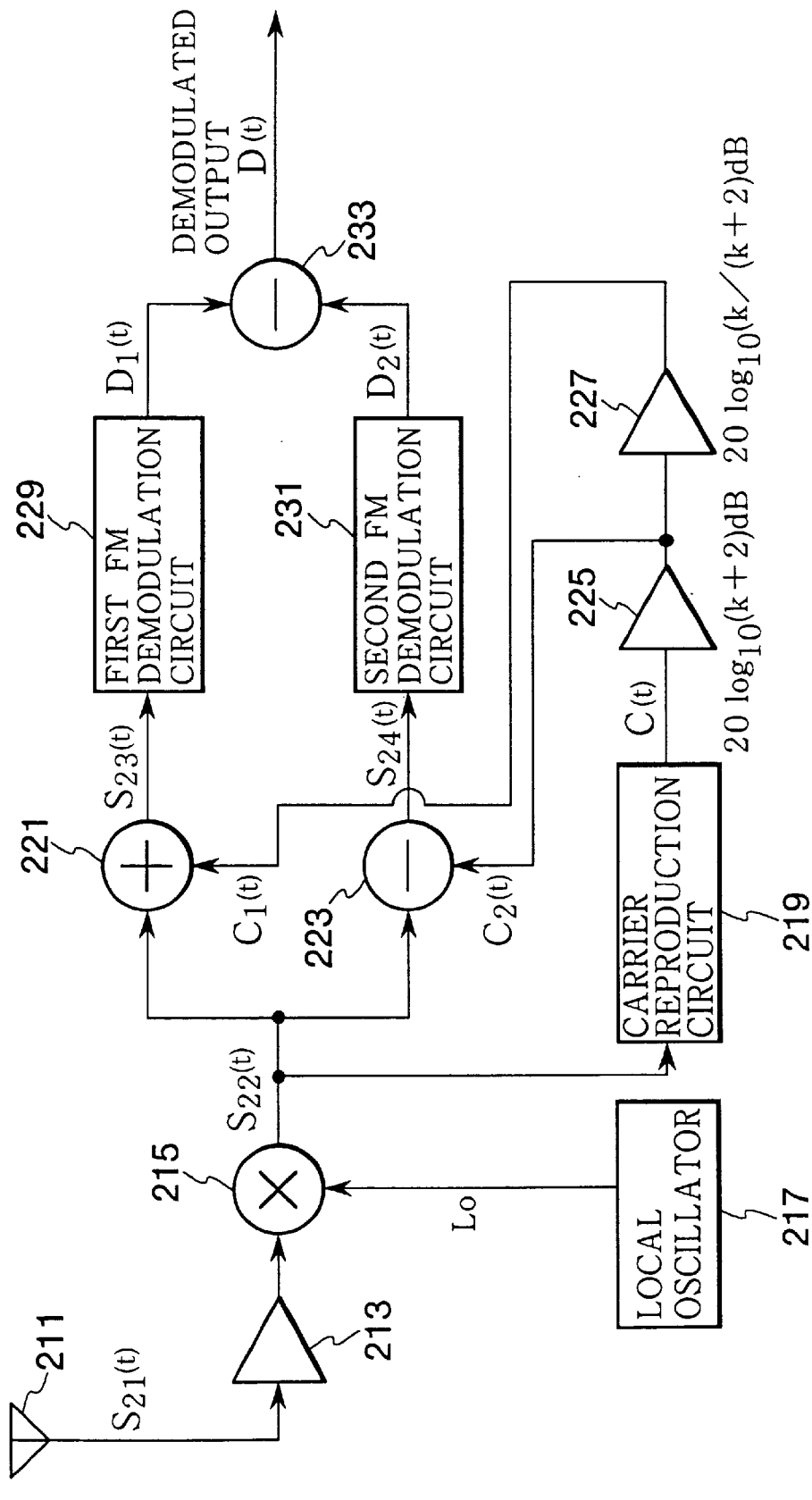
FIG. 13 is a block diagram of another demodulation circuit using the carrier reproduction circuit shown in FIGS. 10 or 11.

In FIG. 13, a signal $S_{21}(t)$ supplied by an antenna 211 is amplified by an amplifier 213. The resultant signal is mixed with a local signal Lo supplied from a local oscillator 217 by a mixer 215. As a result, the signal $S_{21}(t)$ is converted into an intermediate frequency signal $S_{22}(t)$.

The antenna 211, the amplifier 213, the mixer 215 and the local oscillator 217 comprise a reception circuit. The intermediate frequency signal $S_{22}(t)$ output by the reception circuit is supplied to a carrier reproduction circuit 219, an adding circuit 221 and a subtraction circuit 223.

The carrier reproduction circuit 219 which has the structure shown in FIGS. 10 or 11, and reproduces carrier C(t) from the intermediate frequency signal $S_{22}(t)$ supplied from the mixer 215.

The carrier C(t) reproduced by the carrier reproduction circuit 219 is amplified by $20 \cdot \log_{10}(k+2)$ dB (k is an arbitrary positive number) by an amplifier 225. The amplified signal is further amplified by $20 \cdot \log_{10}(k/k+2)$ dB by an amplifier 227 (functionally, it is an attenuation circuit). Therefore, the first reproduced carrier $C_1(t)$ output from the amplifier 227 is a signal amplified the carrier C(t) reproduced by the carrier reproduction circuit 219 by $20 \cdot \log_{10} k$ dB.

The reproduced carrier C(t) amplified by the amplifier 225 is output as a second reproduced carrier $C_2(t)$.

The adding circuit 221 adds the first reproduced carrier $C_1(t)$ and the intermediate frequency signal $S_{22}(t)$, and outputs the resultant signal as a signal $S_{23}(t)$.

The subtraction circuit 223 subtracts the intermediate frequency signal $S_{22}(t)$ from the second reproduced carrier $C_2(t)$ supplied from the amplifier 225, and outputs the resultant signal as a signal $S_{24}(t)$.

The signal $S_{23}(t)$ output from the adding circuit 221 is supplied to a first FM demodulation circuit 229, and demodulated by it.

The signal $S_{24}(t)$ output from the subtraction circuit 223 is supplied to a second FM demodulation circuit 231, and demodulated by it.

The first FM demodulation circuit 229 and the second FM demodulation circuit 231 are comprised of a limiter, a frequency discriminator and an integrator. The signal (audio frequency signal) $D_1(t)$ output from the first FM demodulation circuit and the signal $D_2(t)$ output from the second FM demodulation circuit are supplied to a subtraction circuit 233. The subtraction circuit 233 obtains the difference between the signal $D_1(t)$ output from the first FM demodulation circuit 229 and the signal $D_2(t)$ output from the second FM demodulation circuit 231, and generates a demodulated signal $D(t)$.

The operation of the demodulation circuit shown in FIG. 13 will now be described.

In FIG. 13, the signal $S_{21}(t)$ supplied from the antenna 211 is amplified by the amplifier 213, is mixed with the local signal Lo supplied from the local oscillator 217, and is converted into the intermediate frequency signal $S_{22}(t)$ that is represented by equation (16).

$$S_{22}(t)=(n+m\cdot g(t))\cdot\cos(2\cdot\pi\cdot f_c\cdot t)+m\cdot g^{\#}(t)\cdot\sin(2\cdot\pi\cdot f_c\cdot t) \quad (16)$$

The carrier reproduction circuit 219 reproduces the carrier $C(t)$ of the intermediate frequency signal $S_{22}(t)$. The reproduced carrier $C(t)$ is represented by equation (17).

$$C(t)=n\cdot\cos(2\cdot\pi\cdot f_c\cdot t) \quad (17)$$

The amplifier 225 amplifies the reproduced carrier $C(t)$ by $20\cdot\log_{10}(k+2)$ dB, and outputs the amplified signal as the second reproduced carrier $C_2(t)$. The amplifier 227 amplifies the second reproduced carrier $C_2(t)$ by $20\cdot\log_{10} k/(k+2)$ dB, and outputs the amplified signal as the first reproduced carrier $C_1(t)$. The first reproduced carrier $C_1(t)$ output from the amplifier 227 is represented by equation (18), and the second reproduced carrier $C_2(t)$ output from the amplifier 225 is represented by equation (19).

$$C_1(t)=k\cdot n\cdot\cos(2\cdot\pi\cdot f_c\cdot t) \quad (18)$$

$$C_2(t)=(k+2)\cdot n\cdot\cos(2\cdot\pi\cdot f_c\cdot t) \quad (19)$$

The adding circuit 221 adds the first reproduced carrier $C_1(t)$ supplied from the amplifier 227 and the intermediate frequency signal $S_{22}(t)$ supplied from the mixer 215. Therefore, the signal $S_{23}(t)$ output by the adding circuit 221 is represented by equation (20).

The subtraction circuit 223 subtracts the intermediate frequency signal $S_{22}(t)$ supplied by the mixer 215 from the second reproduced carrier $C_2(t)$ supplied by the amplifier 225. Therefore, the signal $S_{24}(t)$ output from the subtraction circuit 223 is represented by equation (21).

$$S_{23}(t) = C_1(t) + S_{22}(t) \quad (20)$$
$$= k\cdot n\cdot\cos(2\cdot\pi\cdot f_c\cdot t)+S_{22}(t)$$

$$S_{24}(t) = C_2(t) - S_{22}(t) \quad (21)$$
$$= (k+2)\cdot n\cdot\cos(2\cdot\pi\cdot f_c\cdot t)-S_{22}(t)$$

The first FM demodulation circuit 229 demodulates the input signal $S_{23}(t)$. The signal $D_1(t)$ output from the first FM demodulation circuit is represented by equation (22). In equation (22), $O((m/(n\cdot k))^4)$ is the total sum of the distortions whose orders are equal to or greater than four.

The second FM demodulation circuit 231 demodulates the input signal $S_{24}(t)$. The signal $D_2(t)$ output from the second FM demodulation circuit 231 is represented by equation (23).

$$D_1(t)=(m/(n\cdot k))\cdot g^{\#}(t)-(m/(n\cdot k))^2\cdot g^{\#}(t)\cdot g(t)-(m/(n\cdot k))^3\cdot\{g^{\#3}(t)/3-g^{\#2}(t)\cdot g(t)\}+O((m/(n\cdot k))^4) \quad (22)$$

$$D_2(t)=-(m/(n\cdot k))\cdot g^{\#}(t)-(m/(n\cdot k))^2\cdot g^{\#}(t)\cdot g(t)+(m/(n\cdot k))^3\cdot\{g^{\#3}(t)/3-g^{\#2}(t)\cdot g(t)\}+O((m/(n\cdot k))^4) \quad (23)$$

The subtraction circuit 233 obtains the difference between the signal $D_1(t)$ output from the first FM demodulation circuit 229 and the signal $D_2(t)$ output from the second FM demodulation circuit 231, and outputs the obtained difference as a demodulated signal $D(t)$. The demodulated signal $D(t)$ is represented by equation (24). It is apparent from (24) that the objective signal $g(t)$ is demodulated.

$$D(t) = D_1(t) - D_2(t) \quad (24)$$
$$= 2\cdot(m/(n\cdot k))\cdot g^{\#}(t)-$$
$$2\cdot(m/(n\cdot k))^3\cdot\{g^{\#3}(t)/3-$$
$$g^{\#2}(t)\cdot g(t)\}+O((m/(n\cdot k))^5)$$

where $O((m/(n\cdot k))^5)$ is the total sum of the distortions whose orders are equal to or greater than five.

When the received signal is an FM signal, there is no distortion of the signals $D_1(t)$ and $D_2(t)$ output by the first and second demodulation circuit 229 and 231, and there is no distortion of the demodulated signal $D(t)$ from the subtraction circuit 233, which differs from the case where the RZSSB signal is demodulated.

By adding the reproduced carriers $C_1(t)$ and $C_2(t)$ to the adding circuit 221 and the subtraction circuit 223, there is influences on the modulation index of the FM signal, but there is no especial influence to the demodulation.

As described above, according to the demodulation circuit shown in FIGS. 12 and 13, the RZSSB style reception signal can be demodulated with less distortion by using the carrier reproduction circuit shown in FIGS. 10 or 11 without using the linearizer. Because the linearizer is not used, the reception signal can be demodulated without distorting the FM signal. That is, the full carrier SSB signal, the reduced carrier SSB signal, the RZSSB signal and the FM signal can be demodulated without distortion (with less distortion).

Although the carrier reproduction circuit of the first and the second embodiments uses the adaptive filters, a normal filter may be used.

The demodulation circuit shown in FIGS. 12 and 13 does not have to be comprised of analog circuits, it can be comprised of digital circuits.

If the demodulation circuit is comprised of digital circuits, the A/D conversion circuit is arranged after the mixer 115 or 215, processes after the A/D conversion circuit are executed by digital processing. The loudspeaker, or the like, produces sound after D/A conversion of the demodulated output D(t), for example.

In this case, the A/D conversion circuit for demodulation can be used as the A/D converter 101 of the carrier reproduction circuit. Moreover, the demodulation circuit and carrier reproduction circuit can be comprised by using the DSP.

The present invention is not limited to the embodiments described above, but may be modified variously and applied to various systems. For example, the circuit structure of the demodulation circuit is not limited to the structure shown in FIGS. 12 and 13, but arbitrary circuits which demodulate the received signal by using the reproduced carrier may be used.

The carrier reproduction circuit of the present invention is not limited to the demodulation circuit, but it may be applied to arbitrary circuits which use the reproduced carrier.

What is claimed is:

1. A digital filter system comprising:
   demultiplexer means (11) for outputting a digital signal, obtained by sampling an analog input signal at a sampling frequency which is N times a carrier frequency, to N systems sequentially;
   N adaptive filters (16 to 19), arranged for the N systems, for filtering the signals output from said demultiplexer means;
   control means (20, 21) for controlling characteristics of said N adaptive filters based on at least one output of said N adaptive filters; and
   multiplexer means (22) for selecting the output signals of said N adaptive filters sequentially and for outputting a single signal.

2. The digital filter system according to claim 1, wherein said multiplexer means (22) comprises means for sequentially selecting the output signals of said N adaptive filters, and for outputting the selected signals as a single signal.

3. The digital filter system according to claim 1, wherein said digital filter system further comprises subtraction means (35 to 38) for obtaining N differences between the N output singles from said demultiplexer (11) and respective output signals from said N adaptive filters; and
   said multiplexer means (22) comprises means for sequentially selecting N output signals from said subtraction means (35 to 38), and for outputting selected signals as a single signal.

4. The digital filter system according to claim 1, further comprising delay means (12 to 15) for delaying the output signals of said demultiplexer means, and for supplying the delayed signals to said N adaptive filters (16 to 19).

5. The digital filter system according to claim 1, wherein said N adaptive filters (41 to 44) change their own characteristics based on tap coefficients supplied from the outside;
   the tap coefficients for each of the adaptive filters are logically divided into N groups (H1 to H4); and
   said control means (51 to 54) controls each of the tap coefficient groups (H1 to H4) of said N adaptive filters based on a corresponding one of the output signals from said N adaptive filters.

6. A digital filter system comprising:
   conversion means (11) for converting a digital signal, obtained by sampling an analog input signal at a sampling frequency which is N times a carrier frequency, into N signals whose carrier frequencies are substantially zero by selecting said digital signal sequentially;
   N adaptive filters (16 to 19) for filtering the N signals from said conversion means and for changing their own characteristics in accordance with an external signal;
   control means (21) for generating the external signal to control the characteristics of said N adaptive filters based on at least one signal output by said N adaptive filters; and
   multiplexing means (22) for multiplexing the output signals of said N adaptive filters, and for outputting a multiplexed signal as a single signal.

7. The digital filter system according to claim 6, wherein said multiplexing means (22) comprises means for sequentially selecting the output signals of said N adaptive filters, and for outputting the selected signals as a single signal.

8. The digital filter system according to claim 6, further comprising subtraction means (35 to 38) for obtaining the differences between N signals output form said conversion means and respective signals output from said N adaptive filters; and wherein said multiplexing means (22) comprises means for selecting the N signals output from said subtraction means, and for outputting the selected signals as a single signal.

9. The digital filter system according to claim 6, further comprising delay means (12 to 15) for delaying the signals output from said conversion means, and for supplying delayed signals to said N adaptive filters.

10. The digital filter system according to claim 6, wherein said N adaptive filters (41 to 44) change their own characteristics based on tap coefficients supplied from the outside;
    the tap coefficients for each of the adaptive filters are logically divided into N groups; and
    said control means (51 to 54) controls each of the tap coefficient groups based on corresponding one of signals output from said N adaptive filters.

11. A carrier reproduction circuit comprising:
    sampling means (101) for sampling an input signal, including a carrier, at a sampling frequency which is N times a carrier frequency, and for outputting the resultant signal;
    demultiplexer means (11) for cyclically outputting the signal from said sampling means to N systems;
    N adaptive filters (16 to 19) for passing predetermined signal components of each of the N output signals from said demultiplexer means therethrough; and
    multiplexer means (22) for multiplexing the outputs of said N adaptive filters, and for outputting a multiplexed signal.

12. The digital filter system according to claim 11, wherein said carrier frequency is an intermediate frequency, and said N adaptive filters have an audio frequency pass band.

13. The digital filter system according to claim 11, wherein each signal output by said demultiplexer means is a substantially zero frequency carrier signal.

14. A carrier reproduction circuit comprising:
    sampling means (101) for sampling an input signal, including a carrier, at a sampling frequency which is N times a carrier frequency, and for outputting the resultant signal;
    demultiplexer means (11) for cyclically outputting the signal from said sampling means to N systems;
    N adaptive filters (16 to 19) for passing predetermined signal components of each of the N output signals from said demultiplexer means therethrough;
    multiplexer means (22) for multiplexing the outputs of said N adaptive filters, and for outputting a multiplexed signal;
    delay means (12 to 15) for delaying signals of each of said N systems for attenuating signals having no periodicity by said N adaptive filters;

subtraction means (20) for obtaining a difference between at least one of the signals output from said N adaptive filters and one of the signals output from said demultiplexer means; and control means (21) for controlling characteristics of said N adaptive filters based on an output signal of said subtraction means.

15. The carrier reproduction circuit according to claim 14, wherein said N adaptive filters (41 to 44) change their own characteristics based on tap coefficients supplied from the outside, and the tap coefficients of each of the adaptive filters are logically divided into N groups;

said subtraction means (45 to 48) comprises N subtracters which obtain the differences between output signals of said N adaptive filters and the signals output from the demultiplexer means; and said control means controls each of the tap coefficient groups in accordance with corresponding signal output from said N subtracters.

16. A carrier reproduction circuit comprising:

conversion means (11) for converting a digital signal, obtained by sampling an analog input signal at a sampling frequency which is N times a carrier frequency, into N signals whose carrier frequency is substantially zero, by sequentially outputting said digital signal to N systems;

N adaptive filters (16 to 19), arranged for said N systems, for filtering input signals; and output means (22) for sequentially selecting signals output by said N adaptive filters, and for outputting the selected signals as a single signal.

17. The carrier reproduction circuit according to claim 16, further comprising:

delay means (12 to 15) for delaying signals of said N systems in order to attenuate signals having no periodicity by said N adaptive filters;

subtraction means (20) for obtaining the difference between at least one of output signals of said N adaptive filters and one of the signals output from said conversion means; and control means (21) for controlling characteristics of said N adaptive filters based on the difference obtained by said subtraction means.

18. The carrier reproduction circuit according to claim 15, wherein said N adaptive filters (41 to 44) change their own characteristics based on tap coefficients supplied from the outside, and the tap coefficients of each of the adaptive filters are logically divided into N groups;

said subtraction means (45 to 48) comprises N subtracters, each of which obtains a difference between a corresponding one of output signals from said N adaptive filters and a corresponding one of output signals from said conversion means; and said control means (51 to 54) control each of the tap coefficient groups of said N adaptive filters in accordance with the difference obtained by corresponding one of said N subtracters.

19. The carrier reproduction circuit according to claim 16, further comprising:

a reception circuit (211 to 217) for receiving a radio signal and supplying the received radio signal to said conversion means;

a first amplifier (225, 227) for generating a first reproduced carrier (C1(t)) by amplifying a carrier output from said output means (22) by a first value;

a second amplifier (225) for generating a second reproduced carrier (C2(t)) by amplifying the carrier output from said output means by a second value;

an adding circuit (221) for adding said first reproduced carrier (C1(t)) and the signal (S22(t)) received by said reception circuit;

a subtraction circuit (223) for obtaining the difference between said second reproduced carrier (C2(t)) and a reception signal (S22(t)) received by said reception circuit;

a first FM demodulation circuit (229) for demodulating a signal (S23(t)) output from said adding circuit;

a second FM demodulation circuit (231) for demodulating a signal (S24(t)) output from said subtraction circuit; and a processing circuit (233) for generating a demodulated signal (D(t)) of the reception signal, by operating on a signal (D1(t)) output from said first FM demodulation circuit (229) and a signal (D2(t)) output from said second FM demodulation circuit (231), and for outputting the demodulated signal.

20. The carrier reproduction circuit according to claim 19, wherein:

said first value is $20 \cdot \log_{10}(k)$ dB; and said second value is $20 \cdot \log_{10}(k+2)$ dB; and "k" is a positive real number.

21. A carrier reproduction circuit comprising:

sampling means (101) for sampling an input signal, including a carrier, at a sampling frequency which is N times a carrier frequency, and for outputting the resultant signal;

demultiplexer means (11) for cyclically outputting the signal from said sampling means to N systems;

N adaptive filters (16 to 19) for passing predetermined signal components of each of the N output signals from said demultiplexer means therethrough;

multiplexer means (22) for multiplexing the outputs of said N adaptive filters, and for outputting a multiplexed signal;

a reception circuit (111 to 117) for receiving a radio signal and supplying the received radio signal to said sampling means as the input signal;

an amplifier (121) for amplifying a carrier output from said multiplexer means (22):

an adding circuit (123) for generating a signal having an emphasized carrier by adding the carrier amplified by said amplifier to the signal received by said reception circuit; and means for detecting a signal output from said adding circuit (123).

22. A digital filter system comprising:

a demultiplexer which outputs a digital signal, obtained by sampling an analog input signal at a sampling frequency which is N times a carrier frequency, to N systems sequentially;

N adaptive filters which are arranged for the N systems and which filter the signals output from said demultiplexer; and a multiplexer which selects the output signals of said N adaptive filters sequentially to output a single signal.

23. The digital filter system according to claim 22, wherein said multiplexer sequentially selects the output signals of said N adaptive filters, and outputs the selected signals as a single signal.

24. The digital filter system according to claim 22, wherein said digital filter system further comprises a subtracter which obtains differences between N output signals from said demultiplexer and respective output signals from said N adaptive filters; and said multiplexer sequentially selects N output signals from said subtracter, and outputs the selected signals as a single signal.

25. The digital filter system according to claim 22, further comprising a plurality of delay circuits, each of which is arranged in a respective one of the N systems.

26. A digital filter system comprising:

a converter which converts a digital signal, obtained by sampling an analog input signal at a sampling frequency which is N times a carrier frequency, into N signals whose carrier frequencies are substantially zero by selecting said digital signal sequentially;

N adaptive filters which filter the N signals from said converter and which change their own characteristics in accordance with an external signal;

a controller which generates the external signal to control the characteristics of said N adaptive filters based on at least one signal output by said N adaptive filters; and a multiplexer which multiplexes the output signals of said N adaptive filters, and outputs a multiplexed signal as a single signal.

27. A carrier reproduction circuit comprising:

a converter which samples an input signal, including a carrier, at a sampling frequency which is N times a carrier frequency, and outputs a resultant signal;

a demultiplexer which sequentially outputs the signal from said converter to N paths;

N adaptive filters which pass predetermined signal components of each of the N output signals from said demultiplexer; and a multiplexer which multiplexes an output of said N adaptive filters, and outputs a multiplexed signal.

28. The carrier reproduction circuit according to claim 27, further comprising:

a delay circuit which delays signals of each of the N paths;

a subtracter which obtains a difference between at least one of the signals output from said N adaptive filters and one of the signals output from said demultiplexer; and a controller which controls characteristics of the N adaptive filters based on an output signal of said subtracter.

29. A carrier reproduction circuit comprising:

a converter which converts a digital signal, obtained by sampling an analog input signal at a sampling frequency which is N times a carrier frequency, into N signals whose carrier frequency is substantially zero;

N adaptive filters each of which filters a respective one of the N signals; and a selector which sequentially selects signals output from said N adaptive filters, and outputs the selected signals as a single signal.

* * * * *

UNITED STATES PATENT AND TRADEMARK OFFICE
CERTIFICATE OF CORRECTION

PATENT NO. : 5,999,574
DATED : December 7, 1999
INVENTOR(S) : SUN et al.

It is certified that error appears in the above-identified patent and that said Letters Patent is hereby corrected as shown below:

Title page,
    ABSTRACT, line 2, change "Ademultiplexer"
        to --A demultiplexer--;

Column 4, line 39, change "ilters" to --filters--;
    line 42, change "daptive" to --adaptive--;

Column 19, line 45 (claim 18, line 1),
    change "claim 15" to --claim 17--;

Signed and Sealed this

Seventh Day of November, 2000

Attest:

Q. TODD DICKINSON

*Attesting Officer*     *Director of Patents and Trademarks*